(12) United States Patent
Beckwith

(10) Patent No.: US 7,424,549 B2
(45) Date of Patent: Sep. 9, 2008

(54) SYSTEM, METHOD, AND ARTICLE OF MANUFACTURE FOR USING A REPLACEABLE COMPONENT TO SELECT A REPLACEABLE QUALITY OF SERVICE CAPABLE NETWORK COMMUNICATION CHANNEL COMPONENT

(75) Inventor: R. William Beckwith, Great Falls, VA (US)

(73) Assignee: Objective Interface Systems, Inc., Herndon, VA (US)

( * ) Notice: Subject to any disclaimer, the term of this patent is extended or adjusted under 35 U.S.C. 154(b) by 601 days.

(21) Appl. No.: 10/118,157

(22) Filed: Apr. 9, 2002

(65) Prior Publication Data

US 2002/0145924 A1    Oct. 10, 2002

Related U.S. Application Data

(60) Provisional application No. 60/282,163, filed on Apr. 9, 2001.

(51) Int. Cl.
*G06F 15/173* (2006.01)
*G06F 3/00* (2006.01)
(52) U.S. Cl. .................. 709/238; 719/328
(58) Field of Classification Search ........... 370/230, 370/232, 351; 709/224, 229, 202, 238; 379/219; 707/103 R; 719/316, 328
See application file for complete search history.

(56) References Cited

U.S. PATENT DOCUMENTS

| | | | |
|---|---|---|---|
| 5,903,735 A | 5/1999 | Kidder et al. | |
| 5,974,237 A | 10/1999 | Shurmer et al. | |
| 6,154,778 A | 11/2000 | Koistinen et al. | |
| 6,202,082 B1 | 3/2001 | Tomizawa et al. | |
| 6,442,138 B1* | 8/2002 | Yin et al. | 370/232 |
| 6,453,320 B1* | 9/2002 | Kukura et al. | 707/103 R |
| 6,552,999 B2 | 4/2003 | Iwase et al. | |
| 6,662,213 B1* | 12/2003 | Xie et al. | 709/206 |
| 6,738,819 B1* | 5/2004 | Li et al. | 709/229 |
| 6,877,023 B1* | 4/2005 | Maffeis et al. | 709/202 |
| 6,891,943 B1* | 5/2005 | Liebl | 379/219 |
| 6,907,609 B1* | 6/2005 | Kukura et al. | 719/316 |
| 2002/0075800 A1* | 6/2002 | Iwase et al. | 370/230 |
| 2002/0112050 A1* | 8/2002 | Ullmann et al. | 709/224 |
| 2002/0186682 A1* | 12/2002 | Kawano et al. | 370/351 |

FOREIGN PATENT DOCUMENTS

| | | |
|---|---|---|
| JP | 10084349 | 3/1998 |
| JP | 2002016599 | 1/2002 |
| WO | WO 96/42173 | 12/1996 |

OTHER PUBLICATIONS

Halteren et al, "Extending CORBA with Specialised Protocols for QoS Provisioning", University of Twente, Sep. 1999.*

(Continued)

*Primary Examiner*—Jungwon Chang
(74) *Attorney, Agent, or Firm*—Venable LLP; Robert S. Babayi

(57) ABSTRACT

A system, method and article of manufacture for communication in a network application. A connection or communication path to a replaceable transport is initiated in a network application. After the initiation, the network application creates an object to accept the connection or communication path. Once the connection or communication path is established, the network application provides QoS information for the replaceable transport to the replaceable transport, and to at least one object corresponding to the connection or communication path.

47 Claims, 21 Drawing Sheets

1200

OTHER PUBLICATIONS

Bill Beckwith, "Using a Real-Time, QoS-based ORB to Intelligently Manage communications Bandwidth in a Multi-Protocol Environment", Objective Interface Systems, Inc., 2000.*

Wang, N., et al., Applying Reflective Middleware Techniques to Optimize a QoS-enabled CORBA Component Model Implementation, Computer Software and Applications Conference 2000. COMPSAC 2000. pp. 492-499.

English Translation of Japanese Office Action dated Jul. 6, 2007.

English Translation of Japanese Final Rejection dated Feb. 5, 2008.

Canadian Office Action dated Apr. 18, 2008.

* cited by examiner

```
CLASS CIRCUIT
{
PUBLIC:
    CIRCUIT();
    VIRTUAL CIRCUIT;

CONST CHAR* QOS_LIST();
    VOID         QOS_LIST CONST CHART TO);

VIRTUAL INT READ (UNSIGNED CHAR*        ITEM, LENGTH = 0;
    VIRTUAL INT WRITE (CONST UNSIGNED CHAR* ITEM, INT LENGTH = 0;

VIRTUAL VOID SHUTDOWN (BOOL WAIT = FALSE) = 0;
```

*FIG. 14*

| METHOD | EXPECTED SEMANTICS |
|---|---|
| READ | READ A NUMBER OF BYTES OF DATA FROM THE NETWORK. EACH CALL MAY PROVIDE UP TO LENGTH BYTES OR LESS.<br>ORB EXPRESS TREATS THE RETURNED DATA AS SEGMENTS IN A STREAM; THE RETURNED DATA MAY BE A PARTIAL GIOP MESSAGE, A FULL GIOP MESSAGE, OR MULTIPLE GIOP MESSAGES. ANY HEADERS OR TRAILERS ADDED BY THE TRANSPORT SHOULD BE REMOVED BEFORE RETURN. THE ACTUAL NUMBER OF BYTES READ IS RETURNED AS THE FUNCTION RESULT. A RETURN OF ZERO (0) OR NEGATIVE ONE (-1) IS INTERPRETED AS A FAILURE OF THE CIRCUIT. THIS CALL SHOULD BLOCK UNTIL DATA IS RECEIVED OR THE CONNECTION FAILS. |
| WRITE | WRITE DATA TO THE NETWORK.<br>THIS METHOD SHOULD WRITE LENGTH BYTES (ALL OF THE ITEM) BEFORE RETURNING. IT SHOULD RETURN RESULT THAT SPECIFIES HOW MANY BYTES WERE ACTUALLY WRITTEN. RETURNING ZERO (0) OR NEGATIVE ONE (-1) IA INTERPRETED AS A FAILURE OF THE CIRCUIT. |
| SHUTDOWN | SHUTDOWN THE CONNECTION. THE WAIT FLAG INDICATES WHETHER THE METHOD SHOULD WAIT FOR COMPLETION OF THE SHUTDOWN. |

FIG. 15

```
CLASS CIRCUIT FACTORY
{
PUBLIC:
    STATIC CIRCUITFACTORY* LOOKUP (CONST CHAR* TYPE);

VIRTUAL_CIRCUIT* INITIATE_CONNECTION
        (CONST CHAR*        USING_ENDPOINT.
         CONST CHAR*        AND_QOS_LIST=0) =0;
```

FIG. 16

```
CLASS ACCEPTOR FACTORY
{
PUBLIC:
    STATIC ACCEPTORFACTORY* LOOKUP (CONST CHAR* TYPE);

VIRTUAL ACCEPTOR* CREATE       USING_ENDPOINT.
        (CONST CHAR*
```

FIG. 17

```
CLASS ACCEPTOR();
   PUBLIC:
      ACCEPTOR ();

VIRTUAL VOID SHUTDOWN (BOOL WAIT = FALSE) =0;
```

*FIG. 18*

| METHOD | EXPECTED SEMANTICS |
|---|---|
| SHUTDOWN | DISCONTINUE ACCEPTANCE OF CONNECTION REQUESTS FROM CLIENTS. ORB EXPRESS DOES NOT ASSUME THAT ACCEPTORS CAN BE REUSED AFTER BEING SHUTDOWN. |

*FIG. 19*

OBJECT ORIENTED APPROACH

CLASS ABSTRACTSELECTOR
{
//THE ABSTRACTSELECTOR CLASS ALLOWS FOR ONE (AND ONLY ONE)
//SELECTOR THAT IS USED BY MIDDLEWARE TO DETERMINE BOTH
//THE APPROPRIATE QUALITY OF SERVICE (QOS) TO USE
//FOR EACH OUTGOING MESSAGE AND THE APPROPRIATE PRIORITY
//TO PASS WITH THE MESSAGE.
//
//WHILE THIS ROUTINE HAS MANY INPUTS THERE ARE ONLY TWO OUT
//PARAMETERS: SEND_PRIORITY AND CONNECTION
PUBLIC:
VIRTUAL VOID SELECT_CHANNEL
(INT&                      SEND_PRIORITY,          // OUT
UNSIGNED INT&               CHANNEL,                // OUT
CONST CHAR*                 CHANNEL_ENDPOINT,       // IN
UNSIGNED INT                NUM_CHANNELS,           // IN
CONST BOOLEAN               CHANNEL_IS_RELIABLE[],  // IN
CONST UNSIGNED INT          CHANNEL_MAX_MSG_SIZE[], // IN
CONST CHAR*                 QOS_LISTS[],            // IN
CONST INT                   LOWER_PRIORITY_CHANNELS[], // IN
CONST INT                   UPPER_PRIORITY_CHANNELS[])=0; // IN
};

FIG. 20

```
CLASS SELECTOR EXAMPLE
{
    //THIS IS AN EXAMPLE IMPLEMENTATION CLASS TO SELECT A
    //COMMUNICATION CHANNEL.

PUBLIC:
    VIRTUAL VOID SELECT_CHANNEL
    (INT&              SEND_PRIORITY,
    UNSIGNED INT&      CHANNEL,
    CONST CHAR*        NET_ENDPOINT,
    UNSIGNED INT       NUM_CHANNELS,
    CONST BOOLEAN      NET_IS_RELIABLE[],
    CONST UNSIGNED INT NET_MAX_MSG_SIZE[],
    CONST CHAR*        QOS_LISTS[],
    CONST INT          LOWER_PRIORITY_CHANNELS[],
    CONST INT          UPPER_PRIORITY_CHANNELS[]);
};

VOID SELECTOR EXAMPLE::SELECT_CHANNEL
(INT&              SEND_PRIORITY,
UNSIGNED INT&      CHANNEL,
CONST CHAR*        NET_ENDPOINT,
UNSIGNED INT       NUM_CHANNELS,
CONST BOOLEAN      NET_IS_RELIABLE[],
CONST UNSIGNED INT NET_MAX_MSG_SIZE[],
CONST CHAR*        QOS_LISTS[],
CONST INT          LOWER_PRIORITY_CHANNELS[],
CONST INT          UPPER_PRIORITY_CHANNELS[]);
{
    //IMPLEMENT AN ALGORITHM TO PICK A CHANNEL AND A SENDING PRIORITY
    CHANNEL=...
    SEND_PRIORITY =...
```

*FIG. 20 CONT.*

PROCEDURAL APPROACH

```
TYPEDEF VOID (*ABSTRACTSELECTOR)
    (INT&            SEND_PRIORITY,          /* OUT */
    UNSIGNED INT*    CHANNEL,                /* OUT */
    CONST CHAR*      NET_ENDPOINT,           /* IN  */
    UNSIGNED INT     NUM_CHANNELS,           /* IN  */
    CONST BOOLEAN    ,NET_IS_RELIABLE[],     /* IN  */
    CONST UNSIGNED INT  NET_MAX_MSG_SIZE[],  /* IN  */
    CONST CHAR*      QOS_LISTS[],            /* IN  */
    CONST INT        LOWER_PRIORITY_CHANNELS[][],
    CONST INT        UPPER_PRIORITY_CHANNELS[][]);

/*THE ABSTRACTSELECTOR FUNCTION ALLOWS FOR ONE (AND ONLY ONE)
// SELECTOR THAT IS USED BY MIDDLEWARE TO DETERMINE BOTH
// THE APPROPRIATE QUALITY OF SERVICE (QOS) TO USE
// FOR EACH OUTGOING MESSAGE AND THE APPROPRIATE PRIORITY
// TO PASS WITH THE MESSAGE.
//
// WHILE THIS ROUTINES HAS MANY INPUTS THERE ARE ONLY TWO OUT
// PARAMETERS: SEND_PRIORITY AND CHANNEL
*/
```

FIG. 21

```
EXTERN VOID SELECT_CHANNEL
    (INT*                   SEND_PRIORITY,
    UNSIGNED INT*            CHANNEL,
    CONST CHAR*              NET_ENDPOINT,
    UNSIGNED INT             NUM_CHANNELS,
    CONST BOOLEAN    NET_IS_RELIABLE[],
    CONST UNSIGNED INT  NET_MAX_MSG_SIZE[],
    CONST CHAR*              QOS_LISTS[],
    CONST INT                LOWER_PRIORITY_CHANNELS[],
    CONST INT                UPPER_PRIORITY_CHANNELS[]);

VOID SELECT_CHANNEL
    (INT*                   SEND_PRIORITY,
    UNSIGNED INT*            CHANNEL,
    CONST CHAR*              NET_ENDPOINT,
    UNSIGNED INT             NUM_CHANNELS,
    CONST BOOLEAN    NET_IS_RELIABLE[],
    CONST UNSIGNED INT  NET_MAX_MSG_SIZE[],
    CONST CHAR*              QOS_LISTS[],
    CONST INT                LOWER_PRIORITY_CHANNELS[],
    CONST INT                UPPER_PRIORITY_CHANNELS[]);
{
    /* IMPLEMENT AN ALGORITHM TO PICK A CHANNEL AND A SENDING PRIORITY */
    *CHANNEL =...
    *SEND_PRIORITY =...
}
```

*FIG. 21 CONT.*

SYSTEM, METHOD, AND ARTICLE OF MANUFACTURE FOR USING A REPLACEABLE COMPONENT TO SELECT A REPLACEABLE QUALITY OF SERVICE CAPABLE NETWORK COMMUNICATION CHANNEL COMPONENT

RELATED APPLICATIONS

This application claims the benefit of U.S. Provisional Application No. 60/282,163, filed Apr. 9, 2001, the disclosure of which is expressly incorporated herein by reference in its entirety.

FIELD OF THE INVENTION

The present invention relates to communication software and more particularly to providing a common abstraction to quality of service in a communication channel and coordinating scheduling of a computer processor and communication channel resources in a distributed system.

BACKGROUND OF THE INVENTION

Communication hardware and software endeavor to provide mechanisms for favoring selected communication channels where the communication channels compete for common communication resources. The nature of these resources can vary widely among different communication architectures. Communication resource examples include bandwidth, message queues, interrupts, memory mappings, bus priority, and DMA processor time. In order to favor one communication channel over another, the communication architecture will provide mechanisms, and the corresponding methods for users to control these mechanisms, to favor the usage of key communication resources by the selected channel over other channels. Since these mechanisms and the methods to control the mechanisms allow manipulation of the communication service quality, they are referred to as Qualities of Service, or QoS. Because the nature of the communication resources varies widely, the resulting nature of the QoS capabilities of a communication architecture also varies widely.

Most real-time systems are distributed to some extent. A simple example of distribution is the communication of a CPU with one of its devices over a bus. More complex distributed systems enable nodes to communicate with other nodes over great distances through radio signals or networks.

Distributed systems that attempt to satisfy real-time constraints are subject to similar success criteria and obstacles. The goal of real-time middleware, including a real-time Object Request Broker (ORB), is to make both local and remote messages or "invocations" with end-to-end predictability. Distributed systems utilize processor time and resources within the communications hardware. The resources within the communications hardware can vary widely depending on the particular hardware architecture of an interprocessor communications scheme. The communications resources typically would include the available bandwidth for data communications, the dedicated processors involved in implementing the communications hardware, and any relay equipment (switches, cross bars, hubs, routers, bridges, gateways, etc.) in between the communications hardware on the communicating nodes.

Much research has been done and a corresponding rich theoretical foundation exists for both (i) scheduling processor time without regard for inter-node communications and (ii) scheduling inter-node communications and bandwidth without regard for processor time. While some research exists on coordinating the scheduling of inter-node communications with the scheduling of the central processors' nodes, there is little resulting theoretical foundation for helping schedule a specific distributed system or class of distributed systems.

Despite the absence of this theoretical foundation, distributed systems designers who are concerned with optimizing the timeliness goals of a distributed system are forced to make decisions on coordinating the scheduling of processor and communications resources. Typically scheduling decisions for resource areas, processors and communications, are locked into place early in the design of the distributed system. By allowing a distributed system designer to replace the logic used by an infrastructure communications software such as middleware, the designer can alter the scheduling coordination decisions through out and even after the development of the distributed system without changing the architecture or application source code of the system.

The Real-Time Common Object Request Broker Architecture (CORBA) specification defines the "end-to-end predictability" of timeliness in a fixed priority CORBA system as: respecting thread priorities between client and server for resolving resource contention during the processing of CORBA invocations; bounding the duration of thread priority inversions during end-to-end processing; and bounding the latencies of operation invocations.

CORBA is a standard developed by the Object Management Group® (OMG™) that allows interoperable distributed computing among the numerous hardware and software products available today. CORBA is essentially a design specification for an Object Request Broker (ORB). ORBs provide the mechanisms required for objects to communicate locally, on remote devices, written in different languages, or to different places on a network. For more information regarding CORBA, reference may be had to "The Common Object Request Broker: Architecture and Specification" which is continuously updated on the Internet at <www.omg.org>. Another ORB that is readily available on the market is ORBexpress™, which is developed by Objective Interfaces. ORBexpress™ is a high-performance, third-generation implementation of Common Object Request Broker Architecture (CORBA) technology.

Conventional systems however, do not allow application programmers to select a service level for a transport and to control communication channels, manage communication bandwidths, or schedule communications channels associated with the transport.

SUMMARY OF THE INVENTION

An embodiment consistent with the present invention relates to a communication method in a network application comprising: initiating, in a network application, a communication path corresponding to a replaceable transport; creating an object to accept the communication path in the network application; and providing information reflective of a service level for the replaceable transport to the replaceable transport and to at least one object corresponding to the communication path once the communication path is established in the network application.

Another embodiment consistent with the present invention relates to a communication method in a network application comprising: initiating, in a network application, a communication path corresponding to a replaceable transport; creating an object to accept the communication path in the network application; providing information reflective of a service level for the replaceable transport to the replaceable transport and to at least one object corresponding to the communication path once the communication path is established in the network application; receiving a request to send a message, wherein the request includes information reflective of at least one of a selected communication path and a selected service level, and the selected service level reflects at least one of a specified Quality of Service (QoS) associated with deliver of the message and a priority for handling the message by a server; and choosing a communication path and priority to service the request based on the information with the request.

A further embodiment consistent with the present invention relates to a communication method in a network application comprising: receiving a request to send a message, wherein the request includes information reflective of at least one of a selected communication path and a selected service level, and wherein the selected service level reflects at least one of a specified Quality of Service (QoS) associated with deliver of the message and a priority for handling the message by a server; and choosing a communication path and priority to service the request based on the information with the request.

Yet another embodiment consistent with the present invention relates to an apparatus for communication in a network application comprising: a memory having a program that initiates in a network application, a communication path corresponding to a replaceable transport; creates an object to accept the communication path in the network application; and provides information reflective of a service level for the replaceable transport to the replaceable transport and to at least one object corresponding to the communication path once the communication path is established in the network application; and a processor that runs the program.

Another embodiment consistent with the present invention relates to an apparatus for communication in a network application comprising: means for initiating, in a network application, a communication path corresponding to a replaceable transport; means for creating an object to accept the communication path in the network application; and means for providing information reflective of a service level for the replaceable transport to the replaceable transport and to at least one object corresponding to the communication path once the communication path is established in the network application.

Another embodiment consistent with the present invention relates to a computer-readable medium for causing a computer to perform a communication method in a network application, the method comprising: initiating, in a network application, a communication path corresponding to a replaceable transport; creating an object to accept the communication path in the network application; and providing information reflective of a list of Quality of Service (QoS) parameters to the replaceable transport and to at least one object corresponding to the communication path once the communication path is established in the network.

Another embodiment consistent with the present invention relates to an apparatus for communication in a network application comprising: a memory having a program that: initiates, in a network application, a communication path corresponding to a replaceable transport; creates an object to accept the communication path in the network application; provides information reflective of a service level for the replaceable transport to the replaceable transport and to at least one object corresponding to the communication path once the communication path is established in the network application; receives a request to send a message, wherein the request includes information reflective of at least one of a selected communication path and a selected service level, and the selected service level reflects at least one of a specified quality of service associated with deliver of the message and a priority for handling the message by a server; and chooses a communication path and priority to service the request based on the information with the request; and a processor that runs the program.

A further embodiment consistent with the present invention relates to an apparatus for communication in a network application comprising: a memory having a program that; receives a request to send a message, wherein the request includes information reflective of at least one of a selected communication path and a selected service level, and wherein the selected service level reflects at least one of a specified Quality of Service (QoS) associated with deliver of the message and a priority for handling the message by a server; and chooses a communication path and priority to service the request based on the information with the request; and a processor that runs the program.

Another embodiment consistent with the present invention relates to an apparatus for communication in a network application comprising: a memory having a program that receives a request to send a message, wherein the request includes information reflective of at least one of a selected communication path and a selected service level, and wherein the selected service level reflects at least one of a specified Quality of Service (QoS) associated with deliver of the message and a priority for handling the message by a server; and chooses a communication path and priority to service the request based on the information with the request; and a processor that runs the program.

Another embodiment consistent with the present invention relates to a computer-readable medium for causing a computer to perform a communication method in a network application, the method comprising: receiving a request to send a message, wherein the request includes information reflective of at least one of a selected communication path and a selected service level, and wherein the selected service level reflects at least one of a specified Quality of Service (QoS) associated with deliver of the message and a priority for handling the message by a server; and choosing a communication path and priority to service the request based on the information with the request.

Another embodiment consistent with the present invention relates to an apparatus for a communication method in a network application comprising: means for receiving a request to send a message, wherein the request includes information reflective of at least one of a selected communication path and a selected service level, and wherein the selected service level reflects at least one of a specified Quality of Service (QoS) associated with deliver of the message and a priority for handling the message by a server; and means for choosing a communication path and priority to service the request based on the information with the request.

BRIEF DESCRIPTION OF THE DRAWINGS

The accompanying drawings are incorporated in and constitute a part of this specification and, together with the description, explain the features and principles of the invention. In the drawings:

FIG. 14 is a diagram of the Circuit class consistent with the present invention;

FIG. 15 is a diagram showing the expected actions of methods associated with the Circuit class consistent with the present invention;

FIG. 16 is a diagram of the Circuit Factory class consistent with the present invention;

FIG. 17 is a diagram of the Acceptor Factory class consistent with the present invention;

FIG. 18 is a diagram of the Acceptor class consistent with the present invention;

FIG. 19 is a diagram showing the expected actions of methods associated with the Acceptor class consistent with the present invention;

FIG. 20 is a diagram showing an object-oriented approach for determining an appropriate quality of service and priority for a message; and FIG. 21 is a diagram showing a procedural approach for determining an appropriate quality of service and priority for a message.

DESCRIPTION OF THE EMBODIMENTS

Figure 1:
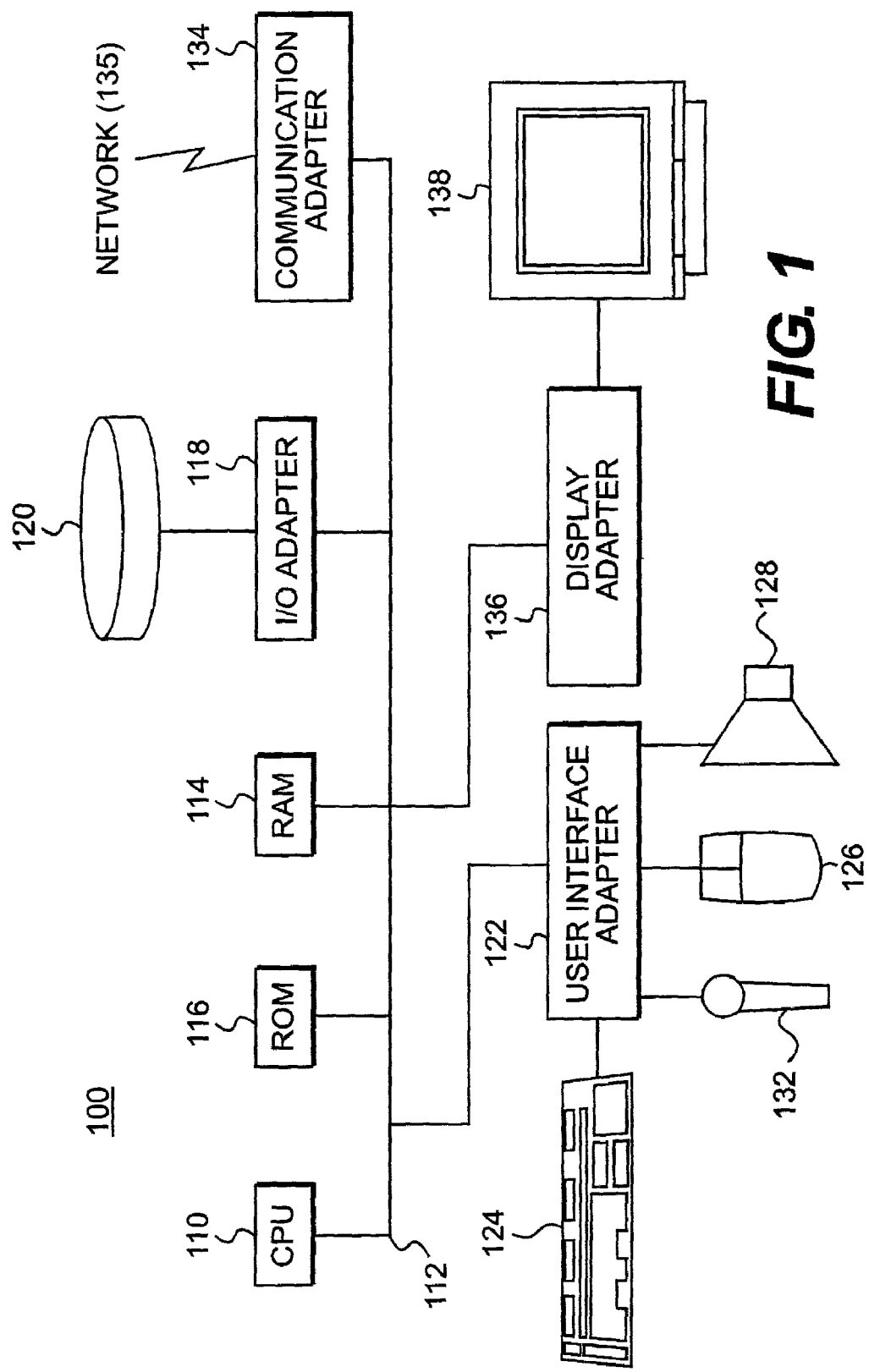
FIG. 1 is a diagram of a computer environment in which features and aspects consistent with the present invention may be implemented.

Reference will now be made in detail to the exemplary embodiments of the invention which are illustrated in the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Terminology and Definitions

Following is a glossary of terms used throughout the following description:

Application Programming Interface (API): An API is a set of functions that can be called to perform actions.

behavior: The observable effects of an object performing the requested operation including its results binding. See language binding, dynamic invocation, static invocation, or method resolution for alternatives.

class: See interface and implementation for alternatives.

client: The code or process that invokes an operation on an object. An object, component, or application that makes requests for services from other objects, components, or applications—implementation objects or servers. An object, component, or application can be a client for some requests and a server for other requests.

CORBA: Common Object Request Broker Architecture.

CORBAServices: CORBAServices are the specifications of the objects that provide basic assistance to developers—they augment the ORB. Some services include Naming, Event Notification, Life Cycle, Transaction, and Properties to name a few.

data type: The description of the kinds of data stored, passed and used. A categorization of values operation arguments, typically covering both behavior and representation (i.e., the traditional non-OO programming language notion of type).

deactivation: The opposite of activation.

domain: A concept important to interoperability, it is a distinct scope, within which common characteristics are exhibited, common rules observed, and over which a distribution transparency is preserved.

exceptions: An unexpected event. The event can contain data, may be defined by the language, developer or the CORBA standard. An exception can be returned by the operation as an alternative. It is normally used to indicate an error condition.

externalized object reference: An object reference expressed as an ORB-specific string. Suitable for storage in files or other external media.

forward declaration: Forward declarations in IDL allow an interface to be referenced before it is declared.

GIOP: General Inter-ORB Protocol (GIOP) specifies a set of message formats and common data representations for communications between ORBs.

IIOP: Internet Inter-ORB Protocol (IIOP) specifies how GIOP messages are exchanged over a TCP/IP network.

Implementation: A definition that provides the information needed to create an object and allow the object to participate in providing an appropriate set of services. An implementation typically includes a description of the data structure used to represent the core state associated with an object, as well as definitions of the methods that access that data structure. It will also typically include information about the intended interface of the object.

implementation inheritance: The construction of an implementation by incremental modification of other implementations. The ORB does not provide implementation inheritance. Implementation inheritance may be provided by higher level tools.

implementation object: An object that serves as an implementation definition. Implementation objects reside in an implementation repository.

implementation repository: A storage place for object implementation information.

inheritance: The construction of a definition by incremental modification of other definitions. The components that another object inherits. Objects inherit only operations and attributes. Multiple inheritance occurs when an interface inherits from more than one interface. See interface and implementation inheritance.

instance: An object is an instance of an interface if it provides the operations, signatures and semantics specified by that interface. An object is an instance of an implementation if its behavior is provided by that implementation. An instance is the representation of an object implementation being executed.

interface: A listing of the operations and attributes that an object provides. This includes the signatures of the operations, and the types of the attributes. An interface definition ideally includes the semantics as well. An object satisfies an interface if it can be specified as the target object in each potential request described by the interface. The interface is a collection of operations that provide services common to object implementations and clients. This includes initializing the ORB and obtaining object references.

Interface Definition Language (IDL): Language that specifies the interfaces of objects independent of any programming language.

interface inheritance: The construction of an interface by incremental modification of other interfaces. The IDL language provides interface inheritance.

interface object: An object that serves to describe an interface. Interface objects reside in an inter-face repository.

interface repository: A storage place for interface information. The Interface Repository allows applications to determine the interface properties of objects at run-time.

interface type: A type satisfied by any object that satisfies a particular interface.

interoperability: The ability for two or more programs to exchange messages using a common protocol.

Interoperable Object Reference (IOR): An Interoperable Object Reference is the equivalent of a distributed, network smart, location transparent pointer.

language binding or mapping: The means and conventions by which a programmer writing in a specific programming language accesses the capabilities of a library of object code.

location transparency: The client does not know whether the target object is local to its own address space, is implemented in a different process on the same machine, or is implemented in a process on a different machine.

marshalling: The process of converting data into a platform independent form that can be transferred across the network.

method: An implementation of an operation. Code that may be executed to perform a requested service. Methods associated with an object may be structured into one or more programs.

method resolution: The selection of the method to perform a requested operation.

middleware: Middleware creates the illusion of multiple servers behaving as one computer system.

module: A module is a group of interfaces and provides a name space for a group of objects. You can collectively refer to objects enclosed in a module.

multiple inheritance: The construction of a definition by incremental modification of more than one other definition.

multithread: A thread is an activity that is executed sequentially. When more that one thread is executed, the activities are collectively referred to as multithreaded.

naming service: The naming service is simply a CORBA server with a standard defined interface. The CORBA specification provides a Resolve_Initial_References as a short cut for obtaining a reference to the naming service. It also allows a way to map easily recognizable names to IORs.

object: A combination of state and a set of methods that explicitly embodies an abstraction characterized by the behavior of relevant requests. An object is an instance of an implementation and an interface. An object models a real-world entity, and it is implemented as a computational entity that encapsulates state and operations (internally implemented as data and methods) and responds to request or services.

object adapter: The ORB component which provides object reference, activation, and state related services to an object implementation. There may be different adapters provided for different kinds of implementations. The object adapter is the part of CORBA that defines how to activate a server so it can be used. It provides the server with access to the ORB and generates object references and invokes methods.

object creation: An event that causes the existence of an object that is distinct from any other object.

object destruction: An event that causes an object to cease to exist.

object implementation: An object implementation, also called a server, provides a response to requests for services for other objects, components, or applications. A given object, component, or application can be a server for some requests and a client for other requests.

object reference: A value that unambiguously identifies an object. An object reference contains all the information about where an object is located and what is needed to communicate with it. Object references are never reused to identify another object.

objref: An abbreviation for object reference.

one-way request: A request where the client does not wait for completion of the request, nor does it intend to accept results. Contrast with deferred synchronous request and synchronous request.

operation: A service that can be requested. An operation has an associated signature, which may restrict which actual parameters are valid. An operation is an action that an object performs—the services that clients can invoke. Operations in IDL define a (possibly remote) call that can be made on an object and have zero or more arguments and return values. The definition of the arguments and return values in IDL is called the operation's signature.

operation name: A name used in a request to identify an operation.

ORB: Object Request Broker. Provides the means by which clients make and receive requests and responses. The ORB communicates requests. It is responsible for identifying and locating objects handling connections delivering data ORB core: The ORB component which moves a request from a client to the appropriate adapter for the target object.

parameter passing mode: Describes the direction of information flow for an operation parameter. The parameter passing modes are IN, OUT, and INOUT.

persistent object: An object that can survive the process or thread that created it. A persistent object exists until it is explicitly deleted.

Portable Object Adapter (POA): The POA provides fundamental services such as object creation, servant registration, and request dispatching. It allows developers to write fully scalable, high performance server applications.

reference: A reference is a pointer in C++.

referencing domain: The Referencing Domain is simply a developer-defined string and represents the developer's partitioning area. This referencing domain is set by an environment variable and is also passed to the daemons through a command line argument.

referential integrity: The property ensuring that an object reference that exists in the state associated with an object reliably identifies a single object.

repository: See interface repository and implementation repository.

request: A client issues a request to cause a service to be performed. A request consists of an operation and zero or more actual parameters.

results: The information returned to the client, which may include values as well as status information indicating that exceptional conditions were raised in attempting to perform the requested service.

servant: A servant is a programming language entity that implements one or more CORBA objects. Servants exist within the contexts of a server application. In C++, servants are object instances of a particular class.

server: A process or apparatus implementing one or more operations on one or more objects. A server (also known as an object implementation) provides a response to requests for services from other objects, components, or applications. An object, component, or application can be a client for some requests and a server for other requests.

server object: An object providing response to a request for a service. A given object may be a client for some requests and a server for other requests.

signature: Defines the parameters of a given operation including their number order, data types, and passing mode; the results if any; and the possible outcomes (normal vs. exceptional) that might occur.

single inheritance: The construction of a definition by incremental modification of one definition. Contrast with multiple inheritance.

skeleton: The object-interface-specific ORB component which assists an object adapter in passing requests to particular methods. The server skeleton is generated by the IDL compiler. The server code is how the server operations are accessed.

state: The time-varying properties of an object that affect that object's behavior.

static invocation: Constructing a request at compile time. Calling an operation via a stub procedure.

stub: A local procedure corresponding to a single operation that invokes that operation when called. The client stub is generated by the IDL compiler. This piece of code allows the client to invoke an implementation object's services.

synchronous request: A request where the client pauses to wait for completion of the request. Contrast with deferred synchronous request and one-way request.

TCP/IP: Transmission Control Protocol/Internet Protocol thread: A thread is an activity that is executed sequentially. More than one thread can be run concurrently. Another term for thread is task.

transient object: An object whose existence is limited by the lifetime of the process or thread that created it.

type: See data type and interface.

typedef: In IDL, the typedef statement provides the ability to define a new name for an existing IDL type (basic or composite). This new name is merely a renaming and does not constitute a different type.

value: Any entity that may be a possible actual parameter in a request. Values that serve to identify objects are called object references.

Overview

Systems and methods consistent with the present invention allow application programmers to create a "plug-in" module that allows the application to dynamically select a priority and QoS of each communication in order to solve the problems discussed above. Furthermore, a programmer can tune and tweak the scheduling of the CPU and network resources. The programmer can select an alternative channel selection algorithm appropriate to the particular application being used.

A network application receives a request to send a message and that requests includes QoS of one of a selected connection and a selected QoS. After the request is received, a connection or communication path to a replaceable transport is initiated in a network application. After the initiation, an object is created to accept the connection or communication path. Once the connection or communication path is established, the network application provides QoS information for the replaceable transport to the replaceable transport, and to at least one object corresponding to the connection or communication path. The QoS is associated with the delivery of the message and a priority for handling the message by a server. The network application then chooses a connection or communication path and priority to service the request based on the information from the request.

Computer Environment

The present invention may be implemented using computer systems in both an independent or a standalone configuration, or as configured in a network environment. Such systems may include personal computers running a variety of operating systems, such as MS-DOS, Linux, LynxOS, Tornado/VxWorks, most Unix variants, Windows 95/98/NT and Macintosh operating systems, as well as computer workstations running the LINUX, UNIX and variants of the UNIX operating system. A representative computer environment is depicted in FIG. 1, which illustrates a typical hardware configuration of a computer workstation in accordance the invention.

Computer workstation 100 may include a central processing unit (CPU) 110, such as a microprocessor, and a number of other units interconnected via a system bus 112. The workstation also may include a Random Access Memory (RAM) 114; Read Only Memory (ROM) 116; an input/output (I/O) adapter 118 for connecting peripheral devices such as disk storage units 120 to the bus 112; a user interface adapter 122 for connecting a keyboard 124, a mouse 126, a speaker 128, a microphone 132, and/or other user interface devices such as a touch screen (not shown) to the bus 112; a communication adapter 134 for connecting the workstation to a communication network (e.g., a data processing network); and a display adapter 136 for connecting the bus 112 to a display device 138. It is to be appreciated that where the computer workstation is functioning as a server computer in a networked computer environment, one or more of the display adapters, keyboard, mouse or other I/O components may be omitted. The workstation typically has resident thereon an operating system, such as the Microsoft Windows family of operating systems (e.g., Windows NT, Windows 95 Windows 98, Windows CE) the IBM OS/2 operating system, the MAC OS, the LINUX operating system or the UNIX operating system.

The hardware environment, in which the present invention may be implemented, may also include computers configured to operate within a network computing environment. The network environment may be a non-publicly accessible or internal network, a publicly accessible network such as the Internet, or any combination thereof. The configuration of parameters governing the network, including the size of the network, the topology of the network, the number of nodes on the network, the communication protocols used on the network, and other issues relating to the configuration and operation of the network, will be within the capacity of a person skilled in the relevant art to determine. Moreover, those skilled the art will appreciate that the present invention may also be implemented on computing platforms and operating systems other than those mentioned above.

Software Implementation Environment

The invention can be implemented using either procedural programming languages or an object oriented programming model and methodology. Examples of languages that employ an object oriented programming model and methodology include Ada 95, Java, Smalltalk, C, Objective C and the C++ languages. Object oriented programming (OOP) has become an increasingly common way to develop complex applications. A need exists for these principles of OOP to be applied to a messaging interface of an electronic messaging system such that a set of OOP classes and objects for the messaging interface can be provided.

Thus, through the development of frameworks for solutions to various problems and programming tasks, significant reductions in the design and development effort for software can be achieved.

CORBA: Common Object Request Broker Architecture

Different ORBs may make quite different implementation choices, and, together with the IDL compilers, repositories, and various Object Adapters, provide a set of services to clients and implementations of objects that have different properties and qualities. In an architecture, the ORB is not required to be implemented as a single component, but rather it is defined by its interfaces. Any ORB implementation that provides an appropriate interface will be acceptable within the context of this invention. The interface will be organized into three categories:

1. Operations that are the same for all ORB implementations
2. Operations that are specific to particular types of objects
3. Operations that are specific to particular styles of object implementations An ORB Core is that part of the ORB that provides the basic representation of objects and communication of requests. CORBA is designed to support different object mechanisms, and it does so by structuring the ORB with components above the ORB Core, which provide interfaces that can mask the differences between ORB Cores.

Figure 2:
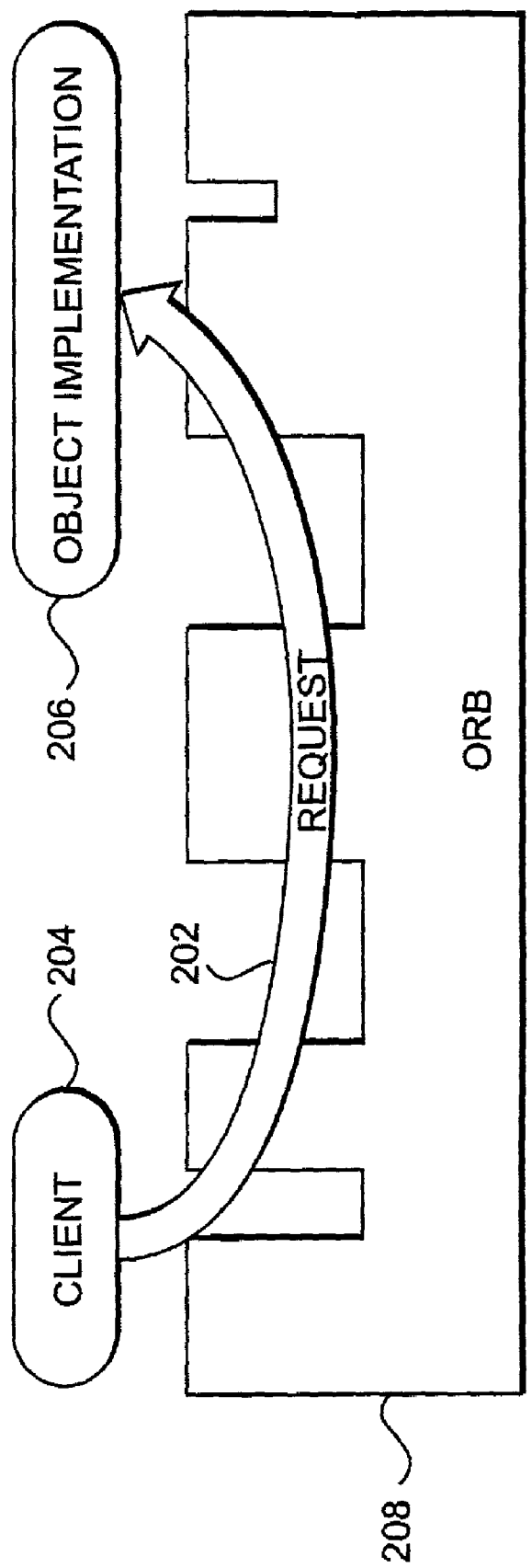
FIG. 2 is a diagram showing a request being sent by a client to an object implementation.

FIG. 2 illustrates a structure of an ORB where a Client 204 sends a request 202 to an Object Implementation 206. Client 204 is an entity that has access to an Object Reference for the object and wishes to perform an operation on the object. The Object Reference is the information needed to specify an object within an ORB. Both clients and object implementations have an opaque notion of object references according to the language mapping and thus are insulated from the reference according to the language mapping are insulated from the actual representation of them. The representation of an object reference handed to a client is only valid for the lifetime of that client.

Client 204 knows only the logical structure of the object according to its interface and experiences the behavior of the object through invocations. It is important to recognize that something is a client relative to a particular object. For example, the implementation of one object may be a client of other objects.

Clients generally see objects and ORB interfaces through a perspective of a language mapping, bringing the ORB right up to the programmer's level. Clients are maximally portable and should be able to work without source changes on any ORB that supports the desired language mapping with any object instance that implements the desired interface. Clients have no knowledge of the Implementation of the Object, which Object Adapter is used by the implementation, or which ORB is used to access it.

Object Implementation 206 is a code and data that provides actual semantics of the object and implements the object. Often the implementation will use other objects or additional software to implement the behavior of the object. In some cases, the primary function of the object is to have side-effects on other things that are not objects. Generally, object implementations do not depend on the ORB or how the client invokes the object. Object implementations may select interfaces to ORB-dependent services by the choice of Object Adapter.

ORB 208 is responsible for all of the mechanisms required to find the Object Implementation for the request, to prepare the Object Implementation to receive the request, and to communicate data making up the request. The interface the client sees is completely independent of where the object is located, what programming language it is implemented in, or any other aspect that is not reflected in the Object's Interface.

Figure 3:
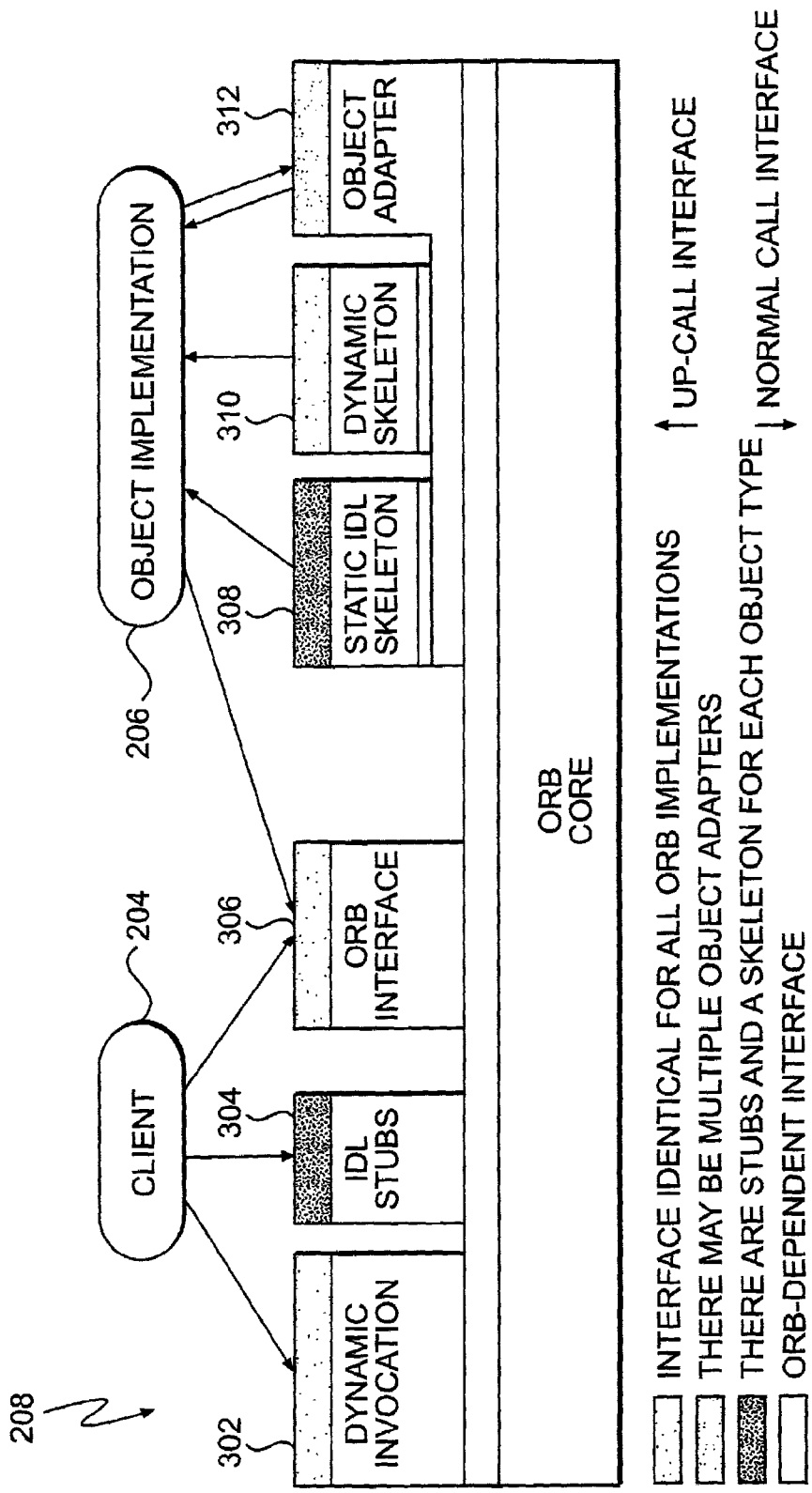
FIG. 3 is a diagram of an individual Object Request Broker (ORB)

FIG. 3 shows a structure of an individual ORB 208. Striped boxes show the interfaces to the ORB, and arrows indicate whether the ORB is called or performs an up-call across the interface. To make a request, Client 204 can use a Dynamic Invocation Interface 302 (the same interface independent of a target object's interface) or an Object Management Group Interface Definition Language Stub (OMG IDL) 314 (the specific stub depending on the interface of the target object).

Dynamic Invocation Interface 302 allows dynamic construction of object invocations, that is, rather than calling a stub routine that is specific to a particular operation on a particular object, a client may specify the object to be invoked, an operation to be performed, and a set of parameters for the operation through a call or sequence of calls. The client code must supply information about the operation to be performed and types of the parameters being passed (perhaps obtaining it from an Interface Repository or other run-time source). The nature of Dynamic Invocation Interface 302 may vary substantially from one programming language mapping to another. Client 204 can also directly interact with the ORB for some functions utilizing the ORB interface 316.

OMG IDL 314 defines the types of objects by specifying their interfaces. An interface consists of a set of named operations and parameters to those operations. Note that although IDL provides conceptual framework for describing the objects manipulated by the ORB, it is not necessary for there to be an IDL source code available for the ORB to work. As long as equivalent information is available in the form of stub routines or a run-time interface repository, a particular ORB may be able to function correctly.

Different object-oriented or non-object-oriented programming languages may prefer to access CORBA objects in different ways. For object-oriented languages, it may be desirable to see CORBA objects as programming language objects. Even for non-object-oriented languages, hiding the exact ORB representation of the object reference, method names, etc. is desirable. A particular mapping of OMG IDL to a programming language should be the same for all ORB implementations. Language mapping includes definition of the language-specific data types and procedure interfaces to access objects through the ORB. It includes the structure of a Client Stub Interface (not required for object-oriented languages), Dynamic Invocation Interface, Implementation skeleton, Object Adapters, and direct ORB interface. The ORB interface is the interface that goes directly to the ORB which is the same for all ORBs and does not depend on the Object's Interface or Object Adapter.

A language mapping also defines the interaction between object invocations and the threads of control in the Client or Implementation. The most common mappings provide synchronous calls in which the routine returns when the object operation completes. Additional mappings may be provided to allow a call to be initiated and control returned to the program. In such cases, additional language-specific routines must be provided to synchronize the program's threads of control with the object invocation.

Object Implementation 206 receives a request as an up-call either through an OMG IDL Generated Skeleton 318 or through a Dynamic Skeleton 310. Dynamic Skeletons may be invoked both through client stubs and through the dynamic-invocation interface. Either style of client request construction interface provides similar results. Rather than being accessed through a skeleton that is specific to a particular operation, an Object's Implementation is reached through an interface that provides access to the operation name and parameters in a manner analogous to the client side's Dynamic Invocation Interface. Purely static knowledge of those parameters may be used, or dynamic knowledge (perhaps determined through an Interface Repository) may be also used, to determine the parameters.

Object Implementation 206 may call the Object Adapter 312 and the ORB while processing a request or at other times. The Object Adapter is the primary way that the Object Implementation accesses services provided by the ORB. Services provided by the ORB through an Object Adapter often include generation and interpretation of object references, method invocation, security of interactions, object and implementation activation and deactivation, mapping object references to implementations, and registration of implementations. Through Object Adapters, it is possible for the ORB to target particular groups of Object Implementations that have similar requirements with interfaces tailored to them.

Definitions of the interfaces to objects can be defined in two ways. Interfaces can be defined statically in the OMG IDL. This language defines the types of objects according to the operations that may be performed on the objects and parameters to those operations. Additionally, interfaces can be added to an Interface Repository service. The Interface Repository service represents components of an interface as objects while permitting run-time access to the components.

The Interface Repository also provides persistent objects that represent the IDL information in a form available at run-time. The Interface Repository information may be used by the ORB to perform requests. Moreover, using the information in the Interface Repository, it is possible for a program to encounter an object whose interface was not known when the program was compiled, yet, be able to determine what operations are valid on the object and make an invocation on it. In addition to its role in the functioning of the ORB, the Interface Repository is a common place to store additional information associated with interfaces to ORB objects.

In any ORB implementation, the IDL (which may be extended beyond its definition in this document) and the Interface Repository have equivalent expressive power. IDL is the means by which a particular object implementation tells its potential clients what operations are available and how they should be invoked. From the IDL definitions, it is possible to map CORBA objects into particular programming languages or object systems.

The Client performs a request by having access to an Object Reference for the object, knowing the type of object and knowing a desired operation to be performed. The Client initiates the request by calling stub routines that are specific to the object or by constructing the request dynamically as seen in FIG. 4.

Figure 4:
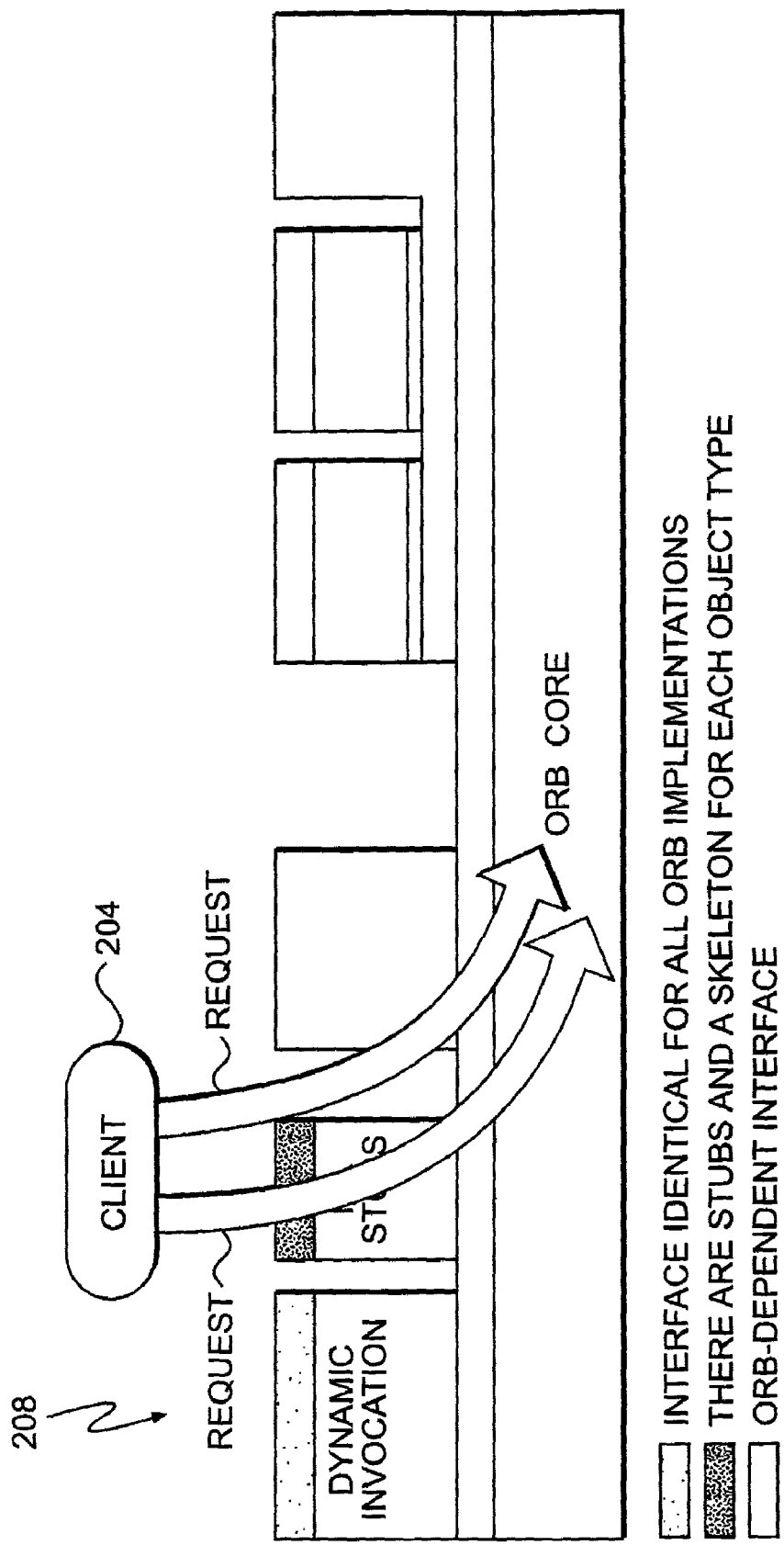
FIG. 4 is a diagram of a client using a stub or dynamic invocation interface of an ORB.
Figure 5:
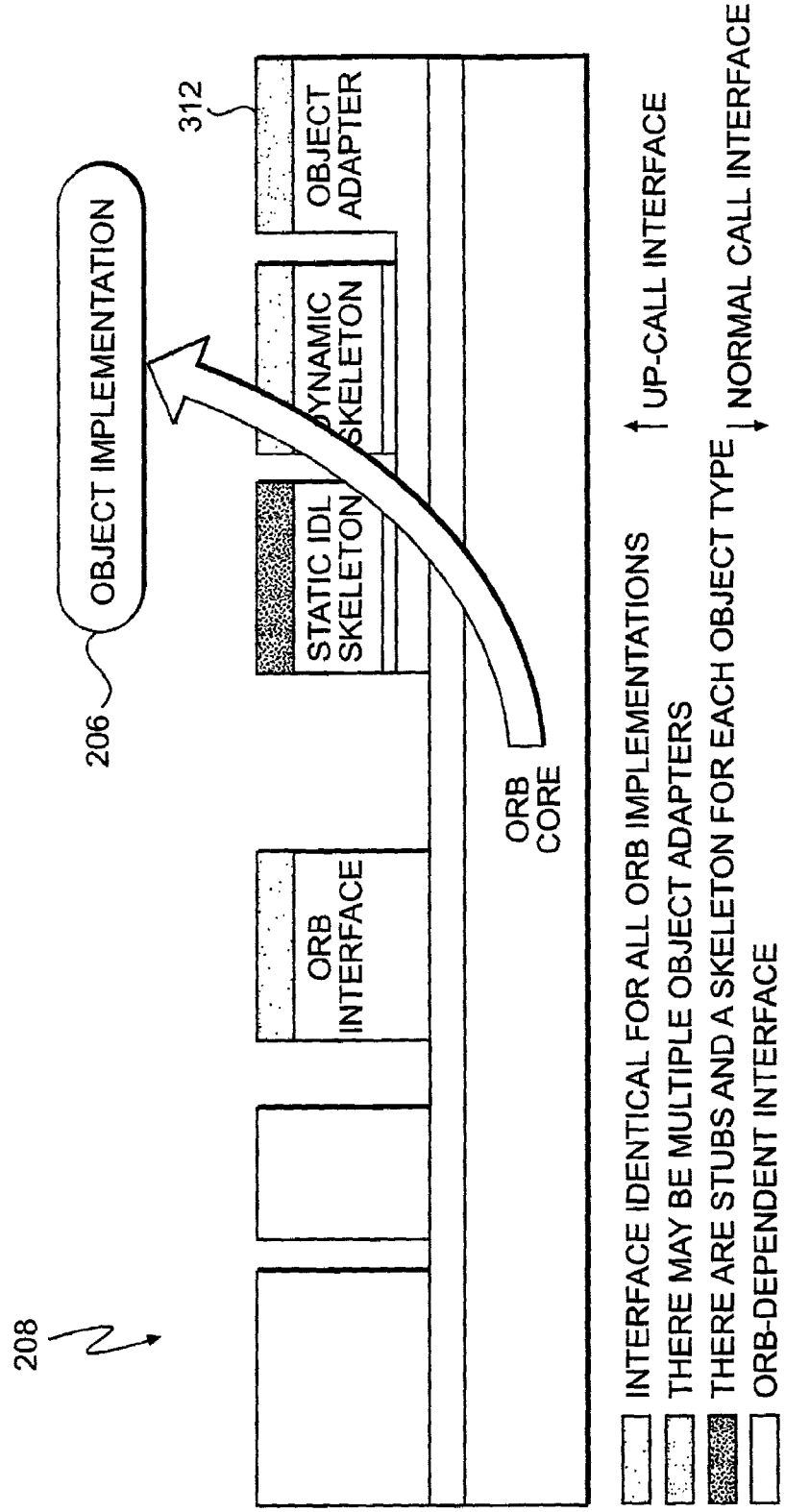
FIG. 5 is a diagram of an object implementation receiving a request of an ORB.

FIG. 4 depicts a Client 204 using the stub or dynamic invocation interface. The stub and dynamic interface for invoking a request satisfies the same request semantics. The receiver of the request cannot tell how the request was invoked. The ORB locates the appropriate implementation code, transmits parameters, and transfers control to the Object Implementation through an IDL skeleton or a dynamic skeleton as seen in FIG. 5. Skeletons are specific to the interface and the object adapter. In performing the request, the object implementation may obtain some services from the ORB through the Object Adapter. When the request is complete, control and output values are returned to the Client.

FIG. 5 illustrates an object implementation 506 receiving a request. The Object Implementation may choose which Object Adapter 312 to use. This decision is based on what kind of services the Object Implementation requires.

Figure 6:
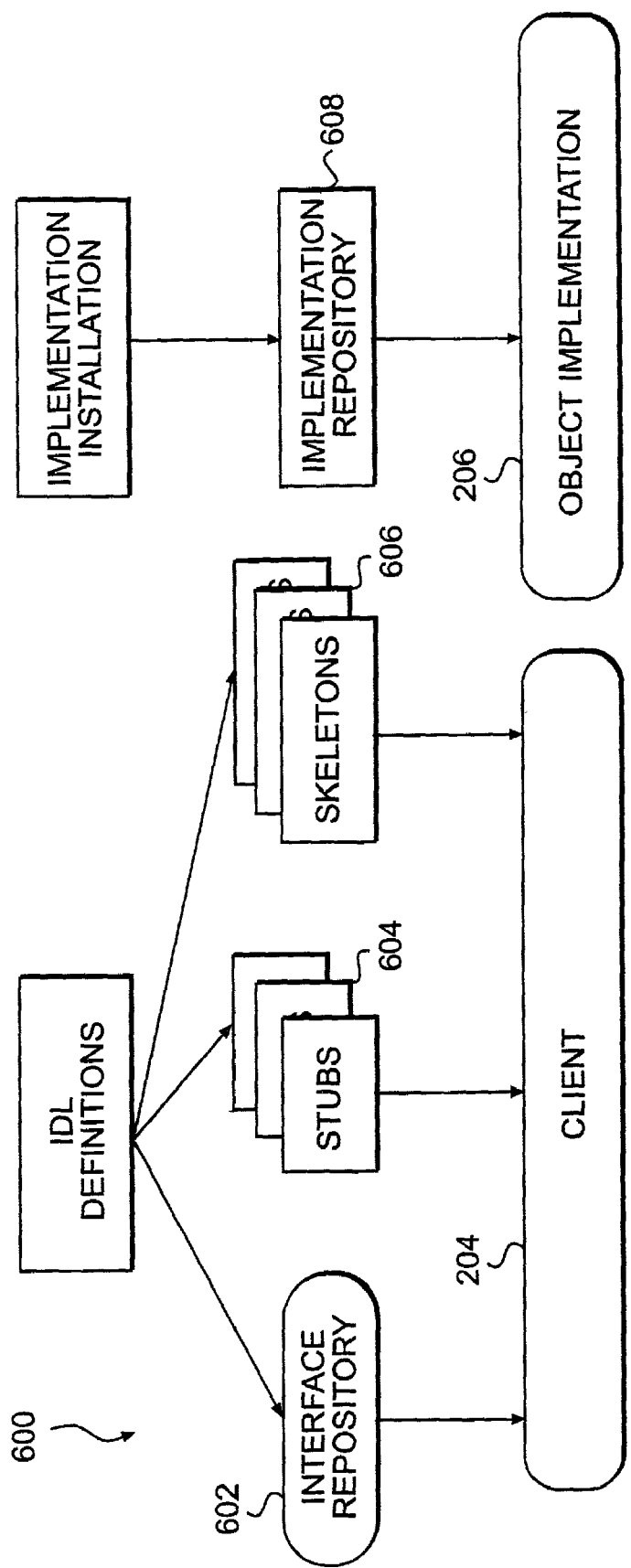
FIG. 6 is a flow diagram for making interface and implementation information available to clients and object implementations.

FIG. 6 is a flow diagram of a process 600 for making interface and implementation information available to Clients and Object Implementations. The interface is defined in OMG IDL and/or in the Interface Repository 622. The definition is used to generate the Client Stubs 614 and the Object Implementation Skeletons 620. For the mapping of a non-object-oriented language, there will be a programming interface to the stubs for each interface type. Generally, the stubs will present access to the OMG IDL-defined operations on an object in a way that is easy for programmers to predict once they are familiar with OMG IDL and the language mapping for the particular programming language. The stubs make calls on the rest of the ORB using interfaces that are private to, and presumably optimized for, the particular ORB Core. If more than one ORB is available, there may be different stubs corresponding to the different ORBs. Object-oriented programming languages, such as C++ and Smalltalk, do not require stub interfaces.

The Object Implementation writes routines that conform to the interface and the ORB calls them through the skeleton. The existence of a skeleton does not imply the existence of a corresponding client stub (Clients can also make requests via the dynamic invocation interface). It is possible to write an object adapter that does not use skeletons to invoke implementation methods.

The Object Implementation information is provided at installation time and is stored in the Implementation Repository 624 for use during request delivery. The Implementation Repository contains information that allows the ORB to locate and activate implementations of objects. Although most of the information in the Implementation Repository is specific to an ORB or operating environment, the Implementation Repository is the conventional place for recording such information. In addition to its role in the functioning of the ORB, the Implementation Repository is a common place to store additional information associated with implementations of ORB objects.

There are a wide variety of ORB implementations possible within the Common ORB Architecture. Some of the different options are described below. Note that a particular ORB might support multiple options and protocols for communication.

Client and Implementation-resident ORB. If there is a suitable communication mechanism present, an ORB can be implemented in routines resident in the clients and implementations. The stubs in the Client either use a location-transparent Interprocess Communication (IPC) mechanism or directly access a location service to establish communication with the implementations. Code linked with the implementation is responsible for setting up appropriate databases for use by Clients.

Server-based ORB. To centralize the management of the ORB, all Clients and Implementations can communicate with one or more servers whose job it is to route requests from Clients to Implementations. The ORB could be a normal program as far as the underlying operating system is concerned, and normal IPC could be used to communicate with the ORB.

System-based ORB. To enhance security, robustness, and performance, the ORB could be provided as a basic service of the underlying operating system. Object References could be made unforgeable, reducing the expense of authentication on each request. Because the operating system could know the location and structure of Clients and Implementations, it would be possible for a variety of optimizations to be implemented, for example, avoiding marshalling when both are on the same machine.

Library-based ORB. For objects that are light-weight and whose implementations can be shared, the implementation might actually be in a library. In this case, the stubs could be the actual methods. This assumes that it is possible for a Client program to get access to the data for the objects and that the Implementation trusts the Client not to damage the data.

Figure 7:
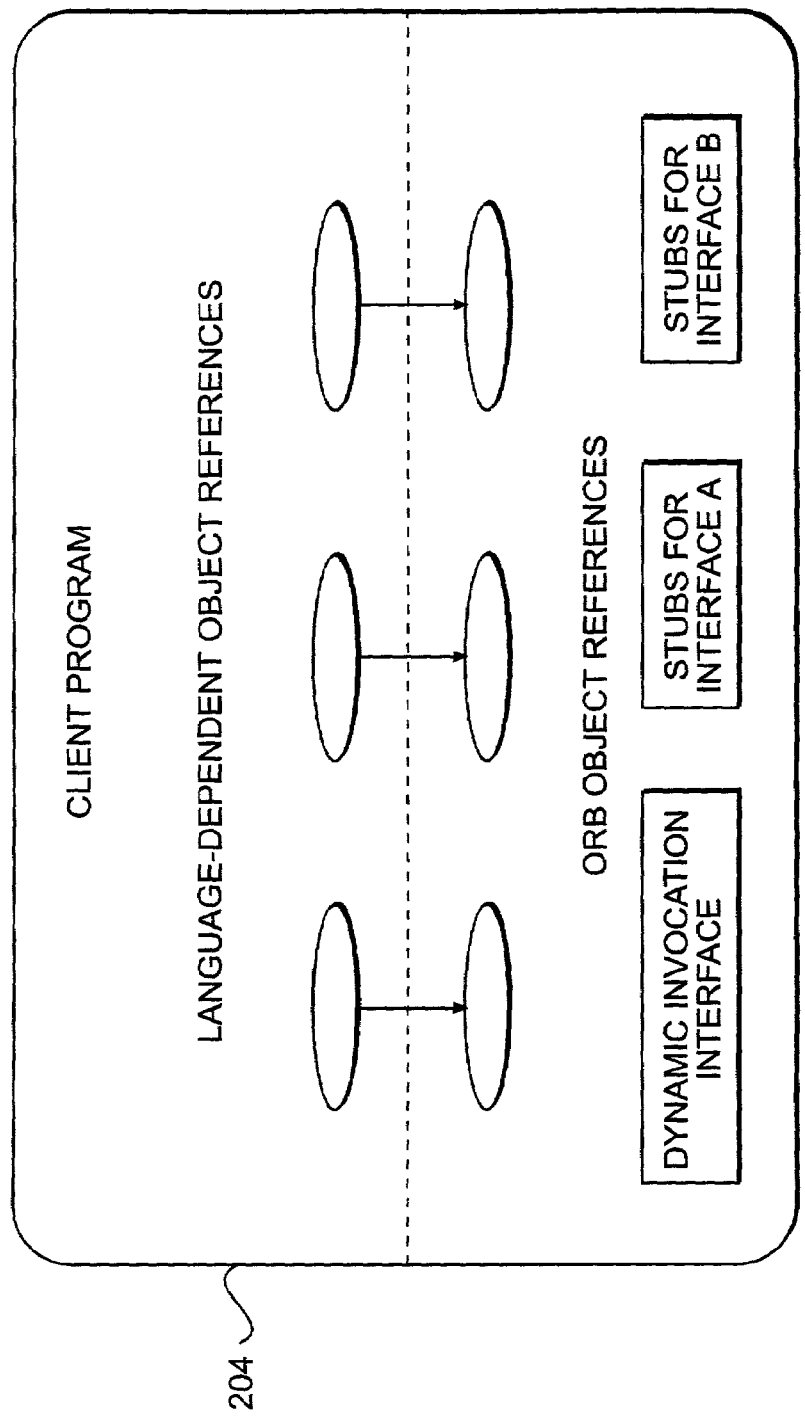
FIG. 7 is a diagram of a client in an ORB.

FIG. 7 illustrates the structure of a Client 204. A Client 204 of an object has an Object Reference that refers to that object. An Object Reference is a token that may be invoked or passed as a parameter to an invocation on a different object. Invocation of an object involves specifying the object to be invoked, the operation to be performed, and parameters to be given to the operation or returned from it. The ORB manages the control transfer and data transfer to the object implementation and back to Client 204. In the event that the ORB cannot complete the invocation, an exception response is provided. Ordinarily, Client 204 calls a routine in its program that performs the invocation and returns when the operation is complete.

Clients may access object-type-specific stubs as library routines in their program. The client program thus sees routines callable in the normal way in its programming language. All implementations will provide a language-specific data type to use to refer to objects, often an opaque pointer. Client 204 then passes that Object Reference to the stub routines to initiate an invocation. The stubs have access to the Object Reference representation and interact with the ORB to perform the invocation.

An alternative set of a library code is available to perform invocations on objects, for example when the object was not defined at compile time. In that case, the client program provides additional information to name a type of the object and a method being invoked, and performs a sequence of calls to specify the parameters and initiate the invocation.

Clients most commonly obtain Object References by receiving them as output parameters from invocations on other objects for which they have references. When a Client is also an Implementation, it receives Object References as input parameters on invocations to objects it implements. The Object Reference can also be converted to a string that can be stored in files or preserved or communicated by different means and subsequently turned back into the Object Reference by the ORB that produced the string.

Figure 8:
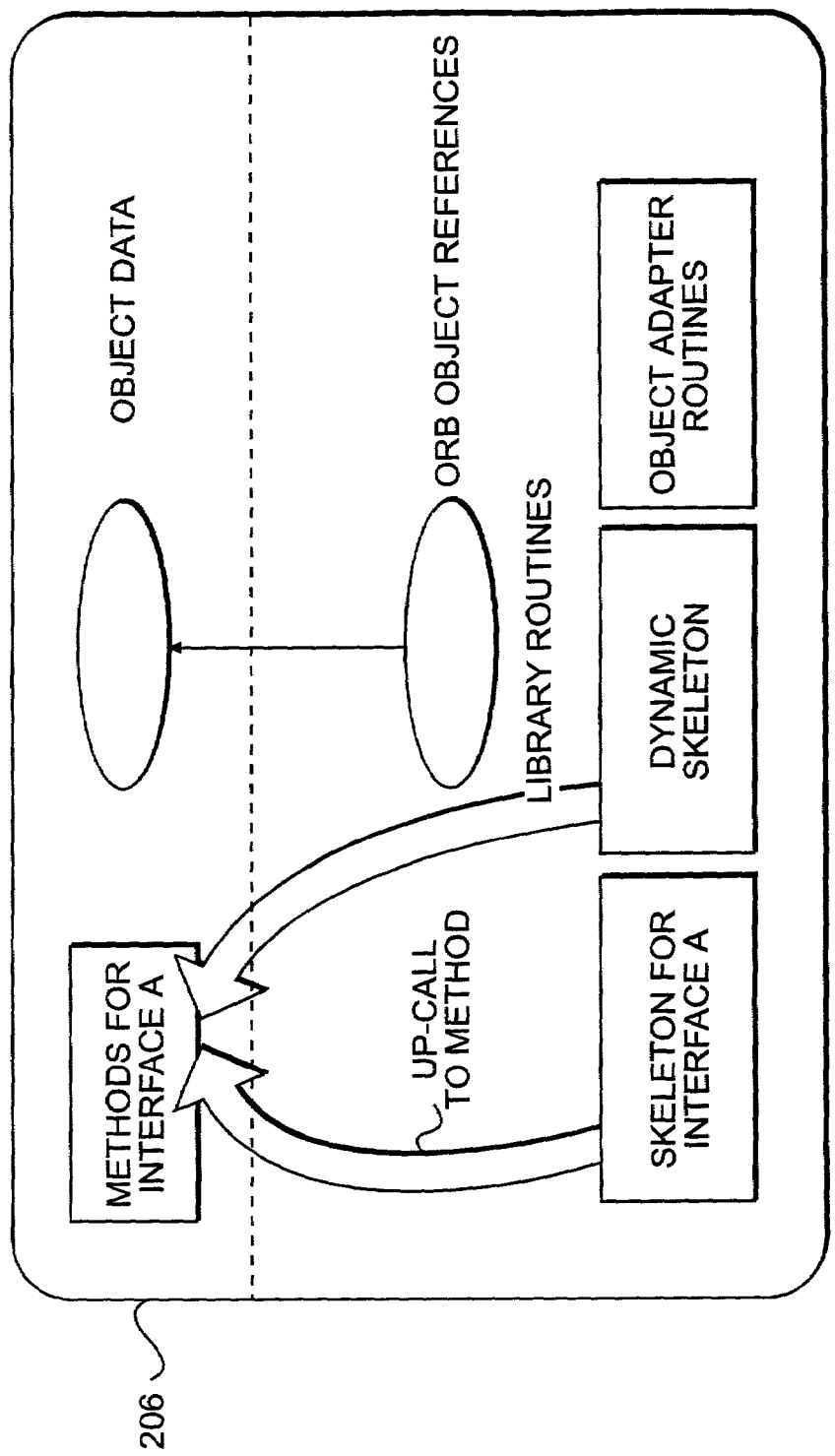
FIG. 8 is a diagram of an object implementation of an ORB.

FIG. 8 illustrates the structure of an Object Implementation 206. Object Implementation 206 provides the actual state and behavior of an object, and can be structured in a variety of ways. Besides defining the methods for the operations themselves, an implementation will usually define procedures for activating and deactivating objects and will use other objects or non-object facilities to make the object state persistent, to control access to the object, and to implement the methods. The Object Implementation interacts with the ORB in a variety of ways to establish its identity, to create new objects, and to obtain ORB-dependent services. It primarily does this via access to the Object Adapter, which provides an interface to ORB services that is convenient for a particular style of object implementation. Considering the range of possible object implementations, it is not practical to attempt to be definitive about how the Object Implementation may be structured.

When an invocation occurs, the ORB Core, Object Adapter, and skeleton arranges a call to an appropriate method of the implementation. A parameter to that method specifies the object being invoked, which the method can use to locate the data for the object. Additional parameters may be supplied according to the skeleton definition. When the method is complete, it returns, causing output parameters or exception results to be transmitted back to the Client.

When a new object is created, the ORB may be notified so that it knows where to find the implementation for that object. The implementation may also register itself as implementing objects of a particular interface, and specify how to start up the implementation if it is not already running.

Most object implementations provide their behavior using facilities in addition to the ORB and Object Adapter. For example, although the Portable Object Adapter provides some persistent data associated with an object, such as its Object Identification (OID or Object ID), a relatively small amount of data is typically used as an identifier for the actual object data stored in a storage service of the Object Implementation's choosing. With this structure, it is not only possible for different Object Implementations to use the same storage service, it is also possible for objects to choose the service that is most appropriate for them.

Figure 9:
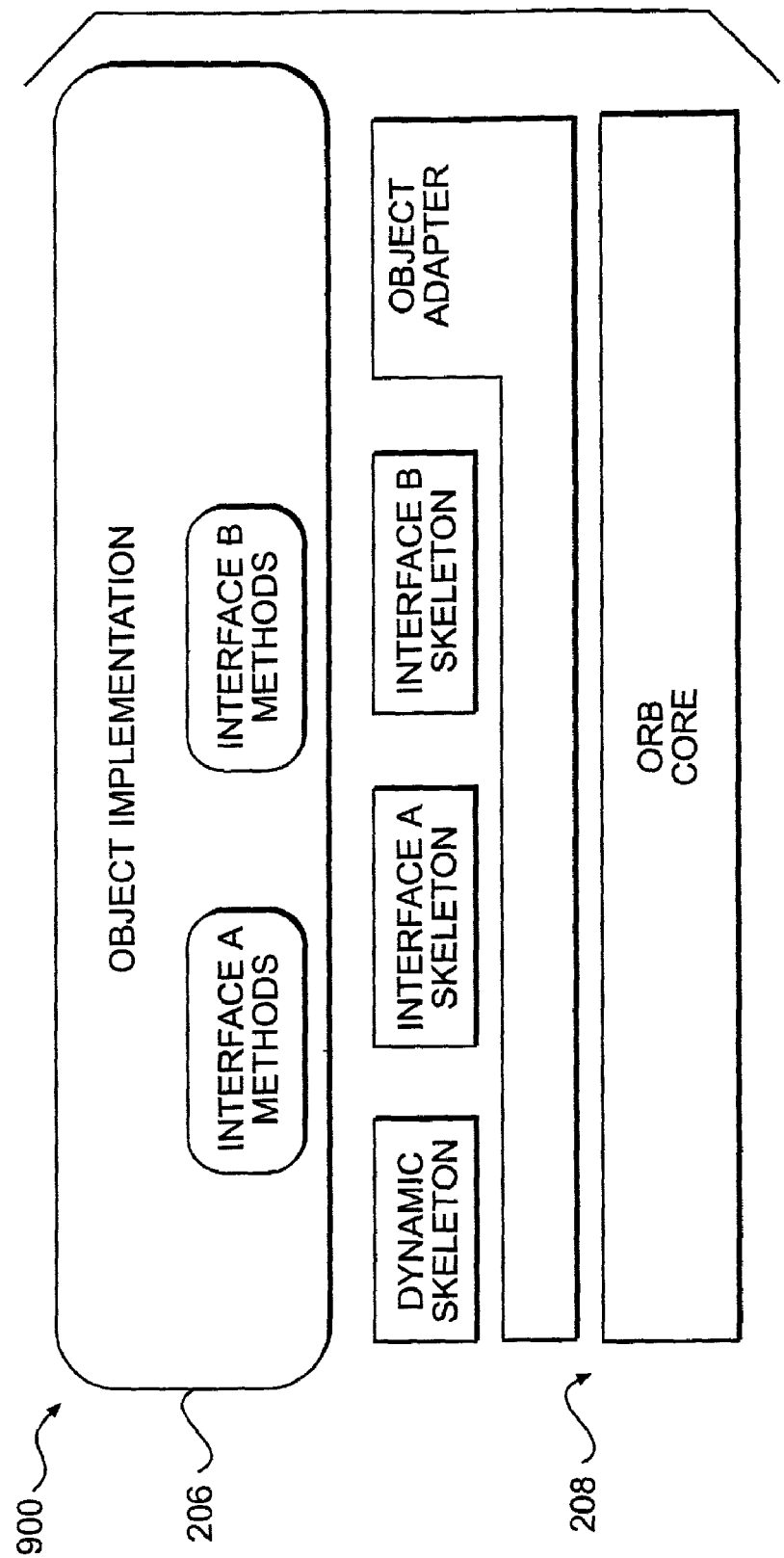
FIG. 9 is a diagram of an object adapter in an ORB.

FIG. 9 illustrates an exemplary structure of an Object Adapter 900. The Object Adapter 900 is the primary means for the Object Implementation 206 to access ORB services such as Object Reference generation. Object Adapter 900 may export a public interface to the Object Implementation and a private interface to the skeleton. Additionally, Object Adaptor 900 is built on a private ORB-dependent interface.

Object Adapters are responsible for the following functions:
  Generation and interpretation of Object References
  Method invocation
  Security of interactions
  Object and implementation activation and deactivation
  Mapping Object References to the corresponding object implementations
  Registration of implementations These functions are performed using the ORB Core and any additional components necessary. Often, the Object Adapter will maintain its own state to accomplish its tasks. It may be possible for a particular Object Adapter to delegate one or more of its responsibilities to the ORB Core upon which it is constructed.

As shown in FIG. 9, Object Adapter is implicitly involved in invocation of the methods, although the direct interface is through the skeletons. For example, Object Adapter may be involved in activating the implementation or authenticating the request. Object Adapter defines most of the services from the ORB that the Object Implementation 206 can depend on. Different ORBs may provide different levels of service. Different operating environments may provide some properties implicitly and require others to be added by Object Adapter. For example, it is common for Object Implementation 206 to want to store certain values in the Object Reference for easy identification of the object on an invocation. If Object Adapter allows the implementation to specify such values when a new object is created, it may be able to store them in the Object Reference for those ORBs that permit it. If the ORB Core does not provide this feature, the Object Adapter would record the value in its own storage and provide it to the implementation on an invocation. With Object Adapters, it is possible for an Object Implementation 206 to have access to a service whether or not it is implemented in the ORB Core. If the ORB Core provides it, the Object Adapter simply provides an interface to it. If not, the Object Adapter must implement it on top of the ORB Core. Every instance of a particular adapter must provide the same interface and service for all the ORBs it is implemented on.

It is also not necessary for all Object Adapters to provide the same interface or functionality. Some Object Implementations have special requirements. For example, an object-oriented database system may wish to implicitly register thousands of objects without making individual calls to the Object Adapter. In such a case, it would be impractical and unnecessary for the Object Adapter to maintain any per-object state. By using an object adapter interface that is tuned towards such object implementations, it is possible to take advantage of particular ORB Core details to provide the most effective access to the ORB.

Client/Server Development Overview using CORBA

If the client does not know whether a target object is local to its own address space, a location transparency is implemented in a different process on the same machine, or is implemented in a process on a different machine. The location transparency is an advantage of CORBA over previously available technologies. CORBA provides both location and access transparency for developing and executing distributed applications. An application's components or objects may be dispersed across processes. As long as both the client and the server make use of the CORBA infrastructure, they can communicate without regard to machine architecture, operating systems, programming languages, or location.

Remote invocation capabilities and late binding features increase the architectural maintainability, flexibility, and reusability for CORBA applications. Applications can be re-partitioned across different distribution architectures without loss of function.

Figure 10:
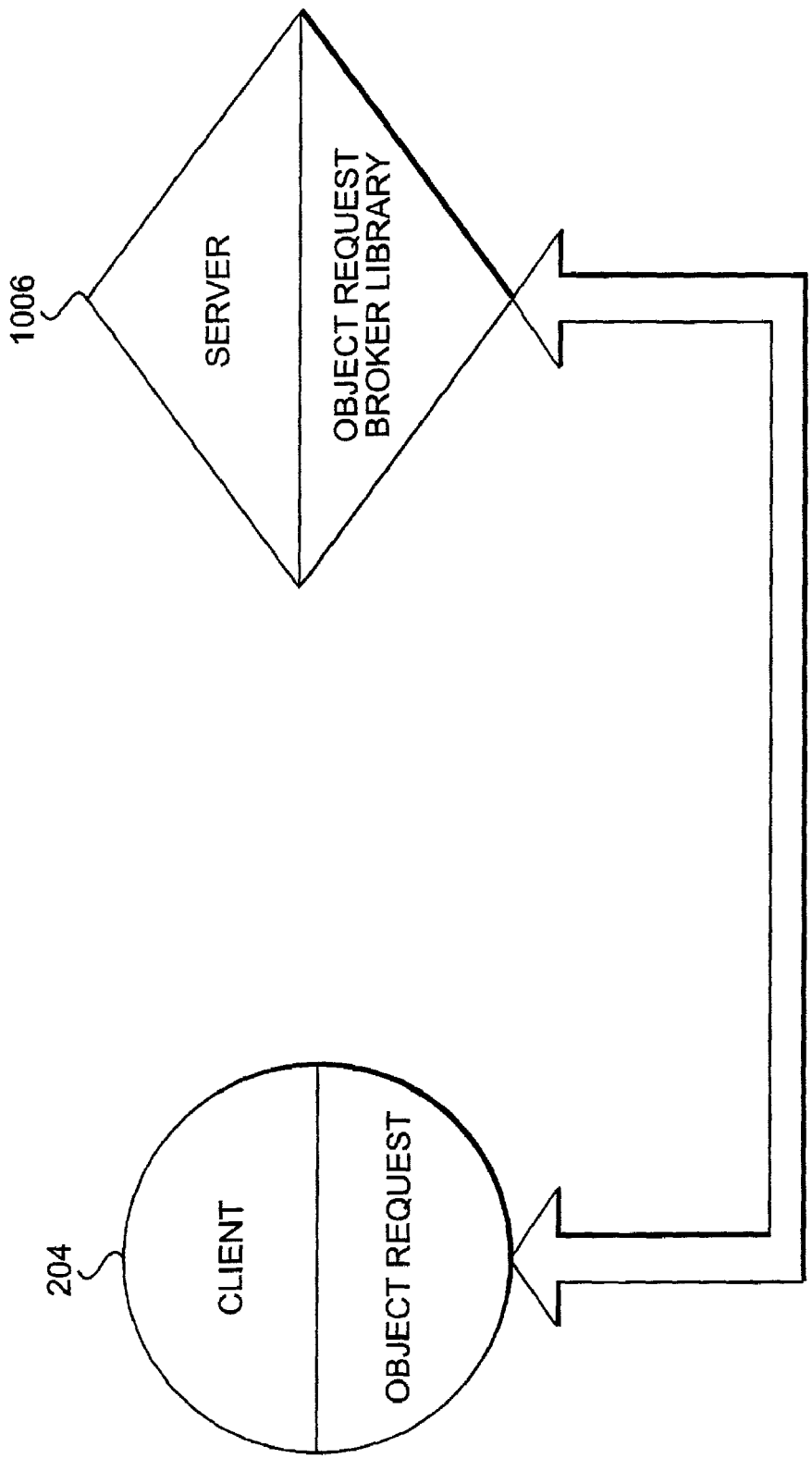
FIG. 10 is a diagram showing how a client sends requests to a server object via an ORB.

FIG. 10 illustrates how Client 204 sends requests to a server object 1006 via the ORB. First, Client 204 sends a request to the server 1006, which is received from the server. A reply is then sent to Client 204 from the server 1006. Data communication from Client 204 to a server, or peer to peer, is accomplished through a well-defined object oriented interface. The ORB determines the location of the target object, sends a request to that object, and returns any response (success or error condition) back to the caller. Through object-oriented technology, developers also may take advantage of features such as inheritance, encapsulation, polymorphism, and runtime dynamic binding. These features allow the applications to be changed, modified and reused with minimal changes to the parent interface. When using CORBA, it is better to think in terms of distributed objects rather than distributed applications. The objects may be thought of as existing on a software bus where they are accessible to all other objects on the bus.

The ORB provides a safe, secure environment for objects to invoke operations on other distributed objects. The primary functions of the ORB are object creation, management, and invocation. The ORB handles requests from the Client 204 to a server object 1006. The ORB determines if the object exists and invokes the requested operation on the object.

Figure 11:
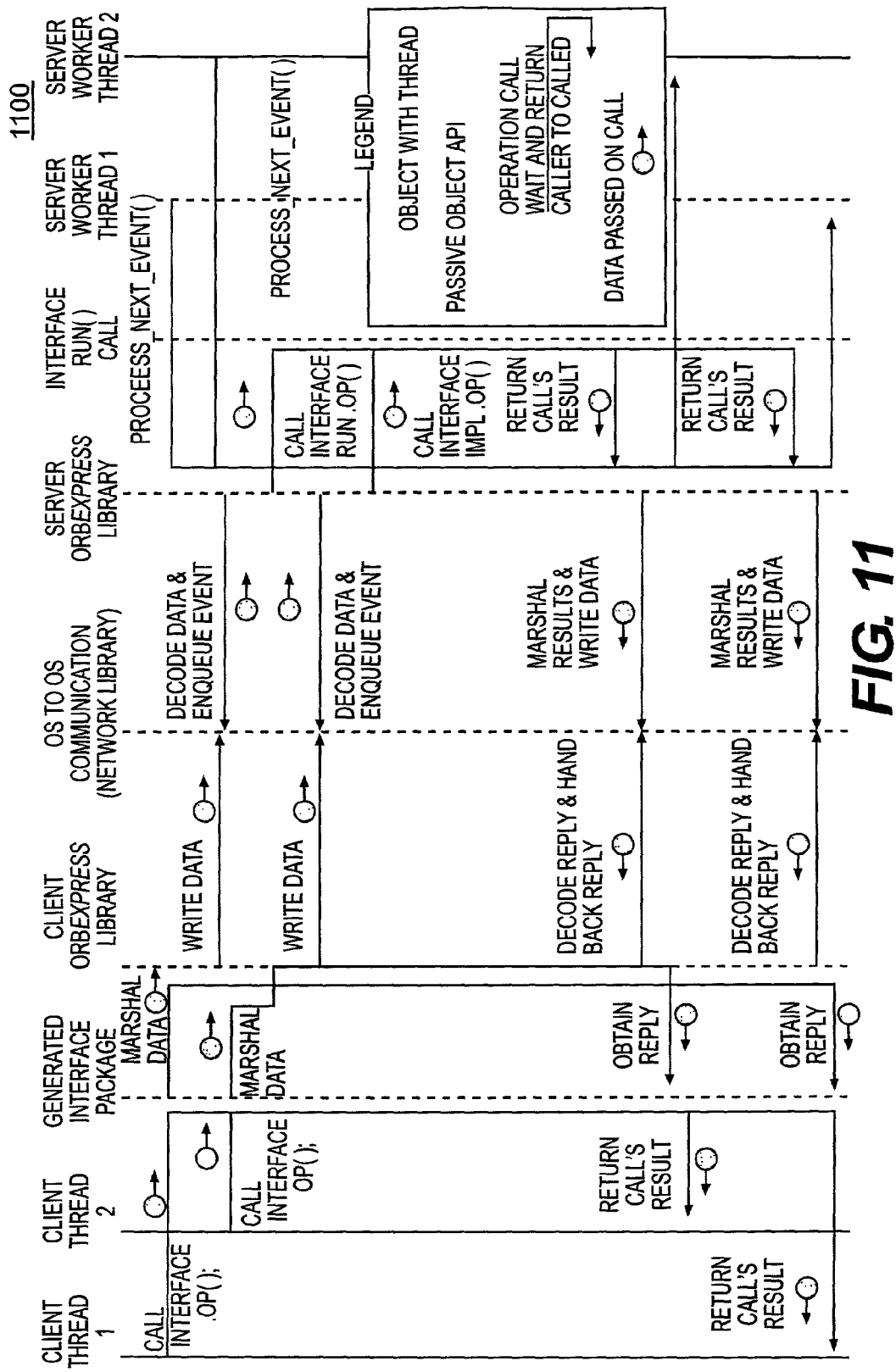
FIG. 11 is a diagram a multi-threading client-server interaction in an ORB.

FIG. 11 illustrates an exemplary multi-threaded client server interaction 1100 in an ORB program. Multi-threading support is an inherent part of the ORB program. It is often difficult to develop server applications that use a single thread of control. When only a single thread is available, the server must serialize the processing of client requests. New requests are queued in the Object Adapter, which may be a Portable Object Adaptor (POA) or other adapter. If a process takes a long time, it prevents the processing of other requests for objects in the same POA. If the queue becomes too long, the POA raises a TRANSIENT exception back to the client, telling it to retry the request.

To detect when requests arrive, ORB implementations use an event loop to monitor network connections. When a request arrives, the ORB sends the request to the application. For this to occur, the ORB must be able to gain control of the thread. Long-running requests tie up the thread, preventing its use for other requests from the ORB or the server. This can cause the client's network transport to stop sending messages altogether or continue to send message and receive errors from the network transport layer. Either way a long running request can cause service to be denied to clients.

To prevent this type of request bottleneck:
the IDL operation can be broken up into parts.
multiple threads can be used.

The ability to create client and server programs that contain multiple threads is a basic capability of the ORB program environment. The ORB program allows clients and servers to create and use multiple threads safely and naturally. Each thread has its own independent local variables (i.e., stack space) and its own thread of control. Each may independently execute or be blocked, irrespective of the behavior of other threads.

Using multiple threads increases the power of ORB program clients and servers:
Non-blocking behavior—A client can make remote calls that do not block the entire Client process. This includes simultaneous calls on the same Object Implementation as well as simultaneous calls on different Object Implementations
Better response time—A server is able to respond to multiple requests from a single or from multiple, parallel clients simultaneously. Each thread can concurrently process and respond to an operation request, regardless of source. Concurrent processing also prevents long server operations from "starving" operations with lesser processing times. Developers may also use additional threads within the body of any Object Implementation class to provide better response time or additional concurrency semantic. FIG. 11, for example, shows two overlapping multi-threading, client-server interactions 1100.

Replaceable Transports

Most distributed applications are designed starting from network interfaces. The problem with this approach is that the design and resulting implementation of the distributed application is bound to a particular network interface and does not allow distributed application to work with other types of transports. For example, an application designed around a socket Application Program Interface (API) cannot be easily changed to work on shared memory interfaces of a switched fabric. By providing a generic transport abstraction that can be bound to multiple transport types, applications can be created that work on multiple transports types. Each transport binding can be structured such that application developers can create their own replaceable transports. By building a middleware infrastructure upon a generic transport, abstraction applications that are built with the middleware infrastructure are also independent of any particular transport interface.

The ability for an application developer to create and insert a new transport protocol underneath an existing middleware infrastructure is useful in many ways, including:

- Application developers can run the application and middleware over transports not originally anticipated by the middleware;
- Application developers can use existing middleware over a more predictable transport protocol;
- Application developers needn't suffer the limitations of TCP's poor error recover mechanisms.

In one embodiment of the present invention, a user who wants to support transports with arbitrary classes of service may provide an API for specifying or defining one or more QoS parameters in a particular transport which results in a replaceable transport capable of using a QoS scheme (e.g., constant bit rate, reliability).

As noted above, users that want to support transports with arbitrary classes of service can specify QoS in the transport. To do this, an addressing scheme (e.g., TCP/IP—host and ports) is used. Also, the QoS parameters that the transport may support are universally abstracted. As an option, send and receive buffer sizes can be specified. Preferably, a user defines what is acceptable and what is not for a particular transport API.

Figure 12:
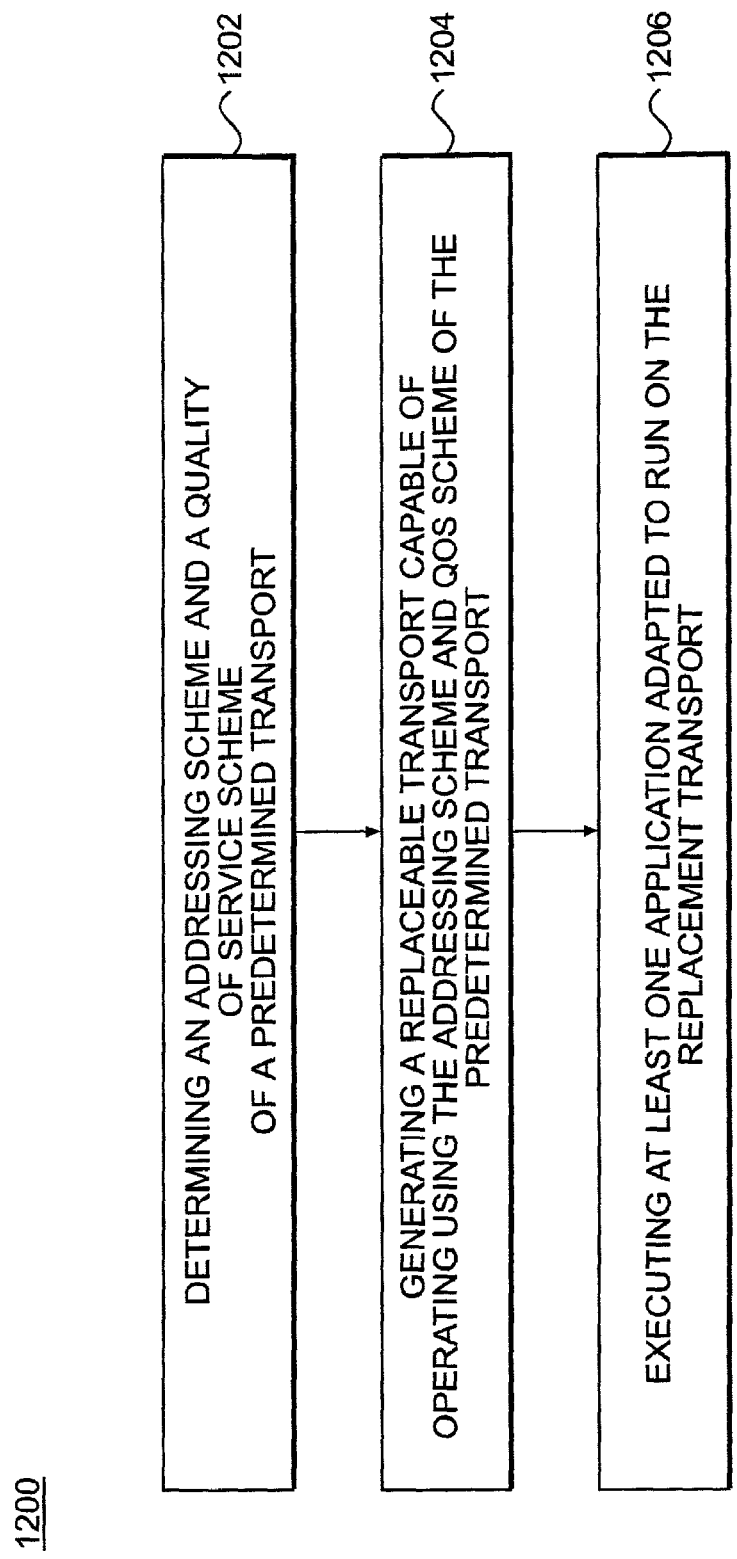
FIG. 12 is a diagram of an exemplary flowchart of a process for affording a replaceable transport in a manner consistent with the present invention.

FIG. 12 illustrates a flow diagram depicting a process 1200 for providing a replaceable transport. In the process, a user, such as an application programmer, creates a "plug-in" module that allows the user to dynamically select a QoS scheme (e.g., one or more QoS parameters) for a transport for communication. In Step 1202, the user determines an addressing scheme and QoS scheme of the transport. Next, a replaceable transport is generated that is capable of operating using the addressing scheme and the QoS scheme of the transport in Step 1204. In Step 1206, at least one application is adapted to run on the replaceable transport. For example, an automotive control system could utilize or access Controller Area Network (CAN) prioritize medium access QoS features offered by CAN computer hardware and software without specific knowledge of the CAN communication software interface.

ORBexpress™, which is a third-generation implementation of CORBA technology, supports a framework that allows for the customization and configuration of the QoS parameters for a transport. QoS parameters are used by some transports to control quantitative aspects of a transport such as guaranteed bandwidth or configurable components of the transport (e.g., selection of a routing algorithm). ORBexpress™ provides base-level support for the definition and management of sets of QoS parameters for a transport, even though the actual parameters are tightly tied to the transport.

Figure 13:
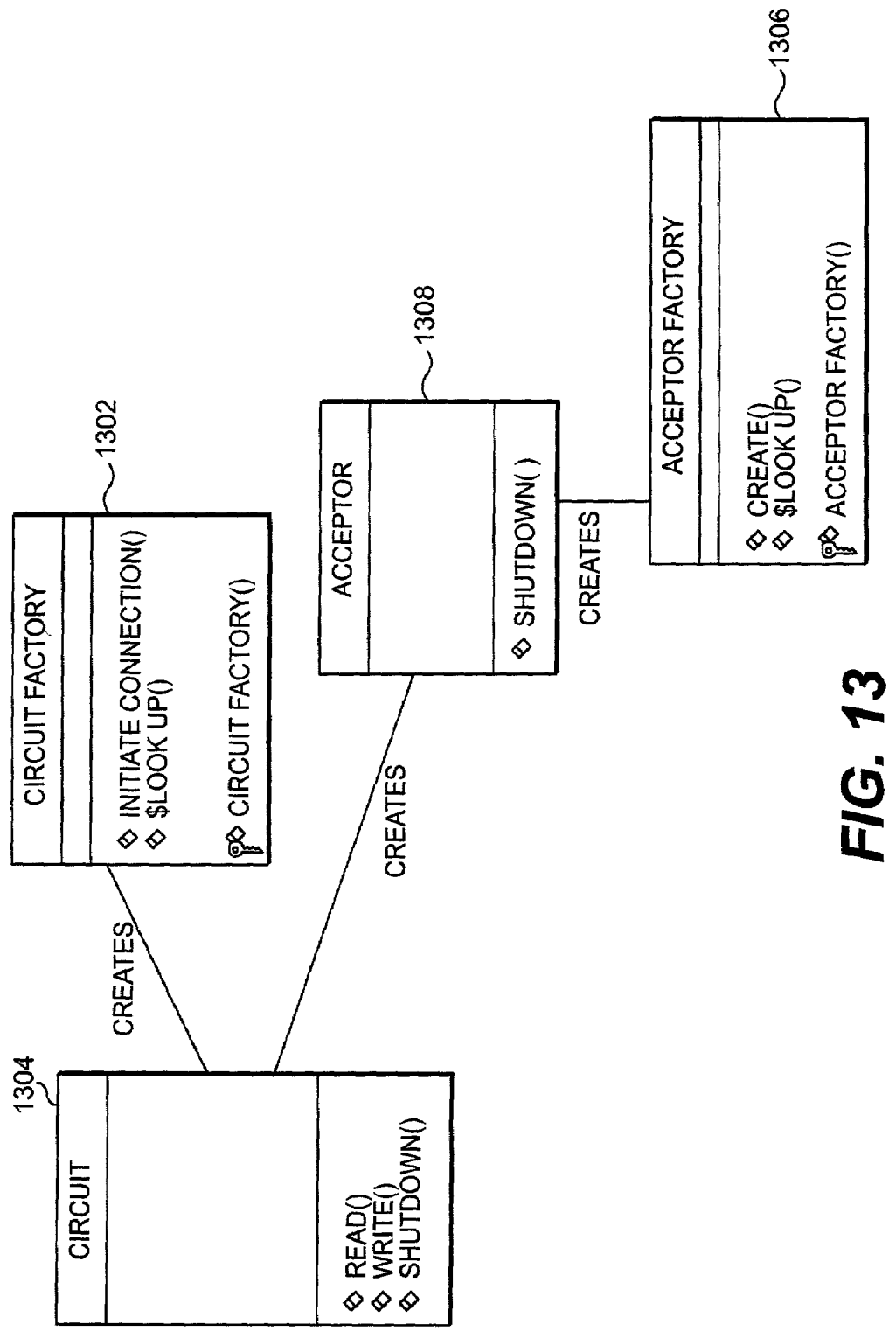
FIG. 13 is a diagram showing relationships between classes used to implement a transport in a manner consistent with the present invention.

FIG. 13 is an exemplary diagram showing relations between classes used to implement a replaceable transport. The classes include Circuit Factory 1302, Circuit 1304, Acceptor Factory 1306, and Acceptor 1308. The transport QoS may be explicitly set with Acceptor Factory 1306 and Circuit Factory 1302 implementations or created as a default QoS that will be provided by the transport used whenever a communication path is created. Upon request Circuit Factory 1302 initiates a call for Circuit 1304 in the ORB. The implementation of the initiated communication path in the Circuit Factory 1302 is responsible for setting up the Circuit instance appropriately. FIG. 16 shows an exemplary diagram of the Circuit Factory class.

FIG. 14 shows an exemplary diagram of the Circuit class. Circuit 1304 includes a read( ) method, write( ) method and a shutdown( ) method. The operation of these methods is summarized in FIG. 15. Read( ) is operable to read a number of bytes of data from the network. ORBexpress™ treats returned data as segments in a stream. The returned data may be a partial General Inter-ORB Protocol (GIOP) message, a full GIOP message, or multiple GIP messages. Any headers or trailers added by the transport should be removed before a return of a function result. The actual number of bytes read is returned as a function result. A return of zero (0) or negative one (−1) is interpreted as a failed connection or communication path of the Circuit 1304. The call is blocked until data is received or the connection or communication path fails.

Write ( ) is operable to write data to the network. A predetermined number of bytes should be written before a result is returned that specifies how many bytes were actually written. A return of zero (0) or negative one (−1) is interpreted as a failed connection or communication path. Shutdown ( ) is operable to shutdown the connection or communication path. A wait flag indicates whether the method should wait for completion of a shutdown.

Once a communication path is established in the Circuit instance, the Acceptor Factory 1306 is initiated for creating an Acceptor 1308, as shown in FIG. 17, which shows an exemplary diagram of the Acceptor Factory class. The Acceptor 1308 passes a QoS list or otherwise sets up each Circuit 1304 instance appropriately. The client can request discontinuance in the Acceptor 1308 of the communication path that will shutdown the communication path, as shown in FIG. 18, which shows an exemplary diagram of the Acceptor class. The ORBexpress™ does not assume that the Acceptor 1308 can be reused after being shutdown, as shown in FIG. 19.

Circuit 1304 holds a static setting of QoS parameters for the transport from the user's request. Once the QoS list is defined, the list can be accessed with a "qos_list" parameter of the Circuit 1304 as shown in FIG. 14. The ORB can then select among the circuits at run time, in accordance with the ORB's real-time circuit selection capabilities for a replaceable transport.

The QoS parameters are defined in a QoS list in the ORB. By defining more parameters, QoS parameters for multiple different transports can be obtained within one QoS list and distinguished between QoS parameters for the particular transport written and those for other transports. The ORB can use the transport parameters without even knowing what they mean, which allows building of applications without worrying about what the transport mechanism consists of. Since the ORB does not interpret the QoS list, it just provides a mechanism to store, select, and transmit the list. Specifically, once a communication path is established, the list is transmitted to the Circuit Factory 1302, Acceptor Factory 1306, and the appropriate transport.

In one embodiment, the parameters from the QoS list contain parameters in string form. The basis of ORBexpress™ QoS framework is a string that represents a list of QoS parameters for a single circuit. The QoS list string is a comma-delimited list of QoS parameters in string form. The string form of a QoS parameter is similar to a transport endpoint string, such as "tcp://rcvbuf=65536." The text before the colon is the name of the transport such as TCP. The text following the colon is a transport specific specification of QoS. Note, for legacy compatibility purposes, "//" may optionally be put after the colon and before the QoS parameter. The text before the colon is the name of the transport. The ORB transmits the parameters to the TCP transport. The transport implementation interprets the QoS parameters. The text following the colon is the QoS specification. The transport may use the values after the colon for a replaceable transport used for communication.

Separate QoS list may be provided for priority bands in the communication by indicating, e.g., "RTCORBA::PriorityBand." A QoS interceptor, e.g., "RTCORBA::QoSinterceptor" may select among the priority bands based on parameters defined in the QoS. Additionally, declaring an instance of a derived class can provide an overriding QoS interceptor. But, if a string containing "tcp://rcvbuf=65536" were passed to the TCP transport, possibly because both TCP and a user's own transport were both used, the TCP transport would use the values after the colon. Therefore, it is better to use a transport-specific tag.

The overriding assumption of the application of QoS to transport communication paths within ORBexpress™ is that the QoS parameters can only be set at the point of creation of a new communication path. But transports with dynamic selection for transports may still be obtained by creating multiple Circuit objects from class Circuit 1304 for a single transport communication path. Each Circuit object can hold a static setting of QoS parameters. The ORB can then select among the circuits at run time in accordance with the ORB's real-time circuit selection capabilities for a replaceable transport. Note that using the QoS framework for a transport may be optional.

QoS Scheduling

A problem with conventional network applications is that selecting communications channel (and thus the QoS used to complete a communication) based solely on a priority of a thread initiating the communication is that the low priority, video data thread could have its priority temporarily boosted via its use of mutexes that implement a priority inheritance or priority ceiling protocol, and could therefore attempt to send video data through the audio communication channel. Since the audio communication channel has a small fraction of allocated bandwidth in comparison to a rate of the video data, the resulting attempt to send video data over an audio communication channel would cause severe disruption of the audio data flow. In priority inheritance, if a mutex is locked and a high priority thread is waiting, then the low priority thread is boosted in priority to assure rapid completion so that the mutex is released automatically to the high priority thread.

Also, priority inversions sometimes occur, i.e., the software is structured so that a low priority thread is running and a high priority thread is waiting for the output. For example, a program is trying to turn the airplane requiring that the flaps change, but the Intraconnect Front End (IFE) has the channel that must be used to initiate the change. One must make sure that the priorities are set up so that the flap interrupt will take priority over the IFE. If there are unbounded states, then a low priority task can stop.

Accordingly, systems and methods consistent with the present invention allow for QoS scheduling. There are several elements to scheduling:

Dispatching, which operates inside the OS, determines which thread will execute next. In a real-time Operating System (RTOS), it is fully preemptive. For example, if there are 256 priorities, then there are 256 queues, and an idle thread that runs at the lowest priority.

Resource protection is a semaphore to protect things and control what runs next and who is in what ready queue.

In a distributed system, there are multiple CPUs, which can result in scheduling breaking down. A scheduling theory can be created for worst case execution time. For example, in a multiprocessor (e.g., a 4 processor system), a worst case execution time would be used to determine how to schedule CPUs and bandwidth that are desired to be used. For instance, telecommunications switches are typically designed to keep communication channels busy, while defense systems are typically designed to optimize the least upper bound CPU execution time.

Preferably, there are multiple communication paths open between a given client and a given server. A thread is dedicated to reading from the recipient side communication path in each of these cases. A client for a given authority creates a message, and then a thread of the same or similar priority reads it, to make sure the information gets through.

An ORB, when it does any given communication, has to make two decisions:

1. Select one of the communication channels; and
2. What priority to send with the request to get an appropriate priority.

This embodiment of the present invention allows a developer to control the execution of his or her communication channels. The developer may use a variety of things to decide to use one communication channel or another, such as thread priority, QoS for the communication, or a communication channel which is less busy, etc.

For example, if you are transmitting HDTV over ATM as an MPEG2 stream, the video consumes 19 Mbits per second and the audio consumes 384 Kbits per second. If you were to send the video and audio over different channels, the human ear could sense a very small disruption of sound, much more so then video. Therefore, a viewer can miss an entire frame of video (a 16.7 millisecond dropout) without detecting jitter, whereas if he or she misses a single millisecond of audio, there will be a detectible change. So, it is desirable to make sure the audio is at a higher priority than video to avoid auditory disruption. Thus, the thread supplying audio data would run at a higher priority than the thread supplying the video data. There are two channels used for communicating the two types of data where the QoS settings for each channel would match the bandwidth required for the data flow. Using virtual circuits on ATM for the communication channel a QoS setting for the video data of Constant Bit Rate (CBR) 19 Mbits per second would be appropriate. Using virtual circuits on ATM for the communication channel, a QoS setting for the audio data of CBR 384 Kbits per second would be appropriate.

The system is allowed to select channels and priority to service the request based on parameters that a programmer provided. Using the present invention the application programmer can determine an algorithm to select what quality of service and priority to select. For example, FIG. 20 shows an object-oriented approach for determining an appropriate quality of service and priority for a message. FIG. 21 shows a procedural approach for determining an appropriate quality of service and priority for a message. One skilled in the art will recognize that alternative approaches may be utilized.

While the present invention has been described in connection with various embodiments, many modifications will be readily apparent to those skilled in the art. For example, although aspects of the present invention are described as being implemented in a middleware such as an Object Request Broker, one skilled in the art will appreciate that these aspects can also be implemented on other applications in forms of middleware such as Remote Procedure Calls (RPCs), non-CORBA distributed object systems, Message-Oriented Middleware (MOM), and published-subscribed based systems, et al. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave, optical signal or digital signal from a network, such as the Internet; or other forms of RAM or ROM either currently known or later developed. The invention, therefore, is not limited to the disclosure herein, but is intended to cover any adaptations or variations thereof.

What is claimed is:

1. A communication method comprising:
    creating, by at least one ORB, an instance of a first transport plug-in to initiate a communication path;
    creating an instance of a second transport plug-in in response to the previously created instance of the first transport plug-in; and
    notifying the at least one ORB of the acceptance of the communication path, wherein the first transport plug-in and the second transport plug-in are based on an implementation of one or more replaceable transport abstractions, and wherein said instances of the first and second transport plug-ins operate in accordance with information reflective of a service level specific to the first and second transport plug-ins, said information having a data form that is not specific to any particular transport.

2. The communication method of claim 1, wherein the information reflective of a service level comprises a list of Quality of Service (QoS) parameters.

3. The communication method of claim 2, wherein the list is comma-delimited.

4. The communication method of claim 1, wherein the the at least one ORB stores the information reflective of the service level without interpreting the information.

5. The communication method of claim 1, further comprising:
    selecting a service level scheduling parameter of communication in the at least one ORB.

6. The communication method of claim 5, wherein the scheduling parameter is at least one of time, priority, latency and bandwidth.

7. The communication method of claim 1, wherein the instance of the first transport plug-in is created at a client and the instance of the second transport plug-in is created at a server.

8. The communication method of claim 1, further comprising:
    receiving a request to send a message, wherein the request includes information reflective of at least one of a selected communication path and a selected service level.

9. The communication method of claim 8, wherein the selected service level reflects at least one of a specified Quality of Service (QoS) associated with a delivery of the message and a specified priority for handling the message by a server, the method further comprising:
    choosing a subsequent communication path and a priority to service the request based on the information with the request.

10. The communication method of claim 1, further comprising:
    instantiating an object operable to read data from a network and write data to the network.

11. The communication method of claim 10, wherein the instantiated object is further operable to shutdown the communication path upon failure.

12. The communication method of claim 1, the further comprising:
    transmitting the information to the at least one transport plug-in instance, a first object corresponding to the communication path, and a second object corresponding to the communication path.

13. The communication method of claim 12, wherein the first object is a factory object which is operable to perform the initiating, and the second object is a factory object which is operable to perform the creating.

14. The method of claim 1, wherein the data form of the information comprises string format.

15. A communication method in a network application comprising:
    creating, by at least one ORB, an instance of a first transport plug-in to initiate a communication path;
    creating an instance of a second transport plug-in in response to the previously created instance of the first transport plug-in;
    notifying the at least one ORB of the acceptance of the communication path, wherein the first transport plug-in and the second transport plug-in are based on an implementation of one or more replaceable transport abstractions, and wherein said instances of the first and second transport plug-ins operate in accordance with information reflective of a service level specific to the first and second transport plug-ins, said information having a data form that is not specific to any particular transport;
    receiving a request to send a message, wherein the request includes information reflective of at least one of a selected communication path and a selected service level, and the selected service level reflects at least one of a specified Quality of Service (QoS) associated with delivery of the message and a specified priority for handling the message by a server; and
    choosing a subsequent communication path and a priority to service the request based on the information with the request.

16. A communication method in a network application comprising:
    receiving, from a first network node, a request to send a message, wherein the request includes information indicating at least one of a selected communication path and a selected service level, said information having a data form that is not specific to any particular transport; and wherein the selected service level reflects at least one of a specified Quality of Service (QoS) associated with delivery of the message and a specified priority for handling the message by a server, wherein the server comprises a second network node; and
    choosing a subsequent communication path and a priority to service the request based on the information with the request.

17. An apparatus for communication comprising:
    a memory having an executable program that:
        creating, by at least one ORB, an instance of a first transport plug-in to initiate a communication path;
        creating an instance of a second transport plug-in in response to the previously created instance of the first transport plug-in; and
        notifying the at least one ORB of the acceptance of the communication path, wherein the first transport plug-in and the second transport plug-in are based on an implementation of one or more replaceable transport abstractions, and wherein said instances of the first and second transport plug-ins operate in accordance with information reflective of a service level specific to the first and second transport plug-ins, said information having a data form that is not specific to any particular transport; and
a processor configured to execute the program.

18. An apparatus for communication in a network application comprising:
means for creating, by at least one ORB, an instance of a first transport plug-in to initiate a communication path;
means for creating an instance of a second transport plug-in in response to the previously created instance of the first transport plug-in; and
means for notifying the at least one ORB of the acceptance of the communication path, wherein the first transport plug-in and the second transport plug-in are based on an implementation of one or more replaceable transport abstractions, and wherein said instances of the first and second transport plug-ins operate in accordance with information reflective of a service level specific to the first and second transport plug-ins, said information having a data form that is not specific to any particular transport.

19. The apparatus of claim 18, wherein the information reflective of a service level comprises a list of Quality of Service (QoS) parameters.

20. The apparatus of claim 19, wherein the list is comma-delimited.

21. The apparatus of claim 18, wherein the at least one ORB stores the information reflective of the service level without interpreting the information.

22. The apparatus of claim 18, further comprising:
means for selecting a service level scheduling parameter of communication in the network application.

23. The apparatus of claim 22, wherein the scheduling parameter is at least one of time, priority, latency and bandwidth.

24. The apparatus of claim 18, further comprising:
means for receiving a request to send a message, wherein the request includes information reflective of at least one of a selected communication path and a selected service level.

25. The apparatus of claim 24, wherein the selected service level reflects at least one of a specified Quality of Service (QoS) associated with a delivery of the message and a specified priority for handling the message by a server, and further comprising:
means for choosing a subsequent communication path and a priority to service the request based on the information with the request.

26. The apparatus of claim 18 further comprising:
means for instantiating an object operable to read data from a network and write data to the network.

27. The apparatus of claim 26, wherein the instantiated object is further operable to shutdown the communication path upon failure.

28. The apparatus of claim 18 further comprising:
means for transmitting the information to the at least one transport plug-in instance, a first object corresponding to the communication path, and a second object corresponding to the communication path.

29. The apparatus of claim 28, wherein the first object is a factory object which is operable to perform the initiating, and the second object is a factory object which is operable to perform the creating.

30. The apparatus of claim 18, wherein the data form of the information comprises string format.

31. A computer storage medium with code embodied therein for causing a computer to perform a communication method, the method comprising:
creating, by at least one ORB, an instance of a first transport plug-in to initiate a communication path;
creating an instance of a second transport plug-in in response to the previously created instance of the first transport plug-in; and
notifying the at least one ORB of the acceptance of the communication path, wherein the first transport plug-in and the second transport plug-in are based on an implementation of one or more replaceable transport abstractions, and wherein said instances of the first and second transport plug-ins operate in accordance with information reflective of a service level specific to the first and second transport plug-ins, said information having a data form that is not specific to any particular transport.

32. The computer storage medium of claim 31, wherein the at least one ORB stores information reflective of the Quality of Service (QoS) without interpreting the information.

33. The computer storage medium of claim 31, further comprising:
selecting a Quality of Service (QoS) scheduling parameter of communication in the network application.

34. The computer storage medium of claim 33, wherein the scheduling parameter comprises at least one of a time, priority, latency and bandwidth.

35. The computer storage medium of claim 31, wherein the instance of the first transport plug-in is created at a client and the instance of the second transport plug-in is created at a server.

36. The computer storage medium of claim 31, further comprising:
receiving a request to send a message, wherein the request includes information
reflective of at least one of a selected communication path and a selected service level.

37. The computer storage medium of claim 36, wherein the selected service level reflects at least one of a specified Quality of Service (QoS) associated with a delivery of the message and a specified priority for handling the message by a server, and further comprising:
choosing a subsequent communication path and a priority to service the request based on the information with the request.

38. The computer storage medium of claim 31 further comprising:
initiating an object operable to read data from a network and write data to the network.

39. The computer storage medium of claim 38, wherein the instantiated object is further operable to shutdown the communication path upon failure.

40. The computer storage medium of claim 31 further comprising transmitting the information to the at least one transport plug-in instance, a first object corresponding to the communication path, and a second object corresponding to the communication path.

41. The computer storage medium of claim 40, wherein the first object is a factory object which is operable to perform the initiating, and the second object is a factory object which is operable to perform the creating.

42. The computer storage medium of claim 31, wherein the list is comma-delimited.

43. The computer storage medium of claim 31, wherein the data form of the information comprises string format.

44. An apparatus for communication in a network application comprising:

a memory having a program that, when executed by a processor:
  creates, by at least one ORB, an instance of a first transport plug-in to initiate a communication path;
  creates an instance of a second transport plug-in in response to the previously created instance of the first transport plug-in;
  notifies the at least one ORB of the acceptance of the communication path, wherein the first transport plug-in and the second transport plug-in are based on an implementation of one or more replaceable transport abstractions, and wherein said instances of the first and second transport plug-ins operate in accordance with information reflective of a service level specific to the first and second transport plug-ins, said information having a data form that is not specific to any particular transport;
  receives, from a first network node, a request to send a message, wherein the request includes information reflective of at least one of a selected communication path and a selected service level, and the selected service level reflects at least one of a specified quality of service associated with delivery of the message and a specified priority for handling the message by a server wherein the server comprises a second network node; and
  chooses a subsequent communication path and priority to service the request based on the information with the request; and
a processor configured to execute the program.

45. An apparatus for communication in a network application comprising:
a memory having a program that when executed by a processor:
  receives, from a first network node, a request to send a message, wherein the request includes information reflective of at least one of a selected communication path and a selected service level, said information having a data form that is not specific to any particular transport, and wherein the selected service level reflects at least one of a specified Quality of Service (QoS) associated with delivery of the message and a specified priority for handling the message by a server, wherein the server comprises a second network node; and
  chooses a subsequent communication path and a priority to service the request based on the information with the request; and
a processor configured to execute the program.

46. A computer storage medium with code embodied therein for causing a computer to perform a communication method in a network application, the method comprising:
  receiving, from a first network node, a request to send a message, wherein the request includes information reflective of at least one of a selected communication path and a selected service level, said information having a data form that is not specific to any particular transport, and wherein the selected service level reflects at least one of a specified Quality of Service (QoS) associated with delivery of the message and a specified priority for handling the message by a server, wherein the server comprises a second network node; and
  choosing a subsequent communication path and a priority to service the request based on the information with the request.

47. An apparatus for a communication method in a network application comprising:
  means for receiving a request, from a first network node, to send a message, wherein the request includes information reflective of at least one of a selected communication path and a selected service level, said information having a data form that is not specific to any particular transport, and wherein the selected service level reflects at least one of a specified Quality of Service (QoS) associated with delivery of the message and a specified priority for handling the message by a server, wherein the server comprises a second network node; and
  means for choosing a subsequent communication path and a priority to service the request based on the information with the request.

* * * * *